(12) United States Patent
Richards et al.

(10) Patent No.: US 8,703,336 B2
(45) Date of Patent: Apr. 22, 2014

(54) METAL-DOPED NICKEL OXIDE ACTIVE MATERIALS

(75) Inventors: Thomas C. Richards, Woodbury, CT (US); Paul Christian, Norton, MA (US); Jennifer A. Nelson, Waltham, MA (US); Kirakodu S. Nanjundaswamy, Potomac Falls, VA (US); Fan Zhang, Newtown, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 13/425,587

(22) Filed: Mar. 21, 2012

(65) Prior Publication Data
US 2013/0252108 A1 Sep. 26, 2013

(51) Int. Cl.
| H01M 4/00 | (2006.01) |
| H01M 4/13 | (2010.01) |
| H01M 4/60 | (2006.01) |
| B23P 19/00 | (2006.01) |
| H01M 10/14 | (2006.01) |

(52) U.S. Cl.
USPC .............................. 429/223; 429/212; 29/730

(58) Field of Classification Search
None
See application file for complete search history.

(56) References Cited

U.S. PATENT DOCUMENTS

| 2,956,860 A | 10/1960 | Welsh et al. |
| 3,437,435 A | 4/1969 | Moore et al. |
| 3,520,729 A | 7/1970 | Voss et al. |
| 4,136,236 A | 1/1979 | Ruetschi et al. |
| 4,192,914 A | 3/1980 | Ruetschi |
| 4,246,253 A | 1/1981 | Hunter |
| 4,312,930 A | 1/1982 | Hunter |
| 4,383,029 A | 5/1983 | Yamada et al. |
| 4,451,543 A | 5/1984 | Dzieciuch et al. |
| 4,777,100 A | 10/1988 | Chalilpoyil et al. |
| 4,959,282 A | 9/1990 | Dahn et al. |
| 4,980,080 A | 12/1990 | Lecerf et al. |
| 5,180,574 A | 1/1993 | Von Sacken |
| 5,264,201 A | 11/1993 | Dahn et al. |
| 5,277,890 A | 1/1994 | Wang et al. |
| 5,348,726 A | 9/1994 | Wang et al. |
| 5,391,365 A | 2/1995 | Wang et al. |
| 5,425,932 A | 6/1995 | Tarascon |
| 5,482,796 A | 1/1996 | Wang et al. |
| 5,532,084 A | 7/1996 | Wang et al. |
| 5,629,110 A | 5/1997 | Kobayashi et al. |
| 5,720,932 A | 2/1998 | Amine et al. |
| 5,759,510 A | 6/1998 | Pillai |
| 5,772,890 A | 6/1998 | Hubred |
| 5,783,334 A | 7/1998 | Yasuda |
| 5,798,180 A | 8/1998 | Chowdhury et al. |
| 5,910,366 A | 6/1999 | Chowdhury et al. |
| 5,952,124 A | 9/1999 | Kainthla |
| 5,955,051 A | 9/1999 | Li et al. |
| 5,955,052 A | 9/1999 | Padhi et al. |
| 6,074,784 A | 6/2000 | Maruta |

(Continued)

*Primary Examiner* — Yoshitoshi Takeuchi
(74) *Attorney, Agent, or Firm* — Leo J. White; Kevin C. Johnson; Steven W. Miller

(57) ABSTRACT

A primary alkaline battery includes a cathode having an alkali-deficient nickel (IV)-containing oxide including metals such as Ni, Co, Mg, Al, Ca, Y, Mn, and/or non-metals such as B, Si, Ge or a combination of metal and/or non-metal ions as stabilizing dopants; a combination of metal ions as dopants; an anode; a separator between the cathode and the anode; and an alkaline electrolyte. The battery can be pre-discharged within one hour after assembly to decrease the open circuit voltage.

11 Claims, 14 Drawing Sheets

(56) References Cited

U.S. PATENT DOCUMENTS

| | | |
|---|---|---|
| 6,162,561 A | 12/2000 | Wang et al. |
| 6,270,921 B1 | 8/2001 | Kaplan et al. |
| 6,274,270 B1 | 8/2001 | Audry et al. |
| 6,284,410 B1 | 9/2001 | Durkot et al. |
| 6,334,993 B1 | 1/2002 | Suita et al. |
| 6,335,119 B1 | 1/2002 | Maruta |
| 6,428,766 B1 | 8/2002 | Fujino et al. |
| 6,472,103 B1 | 10/2002 | Durkot et al. |
| 6,492,062 B1 | 12/2002 | Wang et al. |
| 6,509,117 B1 | 1/2003 | Bowden et al. |
| 6,521,378 B2 | 2/2003 | Durkot et al. |
| 6,566,009 B1 | 5/2003 | Noya et al. |
| 6,589,693 B1 | 7/2003 | Kilby et al. |
| 6,620,550 B2 | 9/2003 | Christian et al. |
| 6,667,131 B1 | 12/2003 | Vitins et al. |
| 6,753,109 B2 | 6/2004 | Nanjundaswamy et al. |
| 6,759,166 B2 | 7/2004 | Wang et al. |
| 6,783,893 B2 | 8/2004 | Bowden et al. |
| 6,794,082 B2 | 9/2004 | Mori et al. |
| 6,818,347 B1 | 11/2004 | Jin et al. |
| 6,858,349 B1 | 2/2005 | Luo et al. |
| 6,932,846 B2 | 8/2005 | Bowden et al. |
| 6,991,875 B2 | 1/2006 | Christian et al. |
| 7,045,247 B1 | 5/2006 | Copeland et al. |
| 7,045,252 B2 | 5/2006 | Christian et al. |
| 7,081,319 B2 | 7/2006 | Christian et al. |
| 7,247,407 B2 | 7/2007 | Durkot et al. |
| 7,273,680 B2 | 9/2007 | Durkot et al. |
| 7,407,521 B2 | 8/2008 | Shimakawa et al. |
| 7,407,726 B2 | 8/2008 | Wang et al. |
| 7,435,395 B2 | 10/2008 | Durkot et al. |
| 7,569,306 B2 | 8/2009 | Kato et al. |
| 7,914,920 B2 | 3/2011 | Davis et al. |
| 8,048,556 B2 | 11/2011 | Davis et al. |
| 2002/0172867 A1 | 11/2002 | Anglin |
| 2004/0009400 A1 | 1/2004 | Yamaguchi et al. |
| 2005/0079424 A1 | 4/2005 | Davis et al. |
| 2005/0152830 A1 | 7/2005 | Yasutomi et al. |
| 2005/0221181 A1 | 10/2005 | Durkot et al. |
| 2007/0015054 A1 | 1/2007 | Nunome et al. |
| 2007/0248879 A1 | 10/2007 | Durkot et al. |
| 2007/0298323 A1* | 12/2007 | Miyamoto et al. ............ 429/223 |
| 2008/0008937 A1 | 1/2008 | Eylem et al. |
| 2008/0171266 A1 | 7/2008 | Kato et al. |
| 2008/0193487 A1 | 8/2008 | Schild et al. |
| 2008/0193847 A1 | 8/2008 | Suetsugu et al. |
| 2008/0241683 A1 | 10/2008 | Fensore et al. |
| 2009/0047578 A1 | 2/2009 | Iwamoto et al. |
| 2009/0249614 A1 | 10/2009 | Davis et al. |
| 2009/0258297 A1 | 10/2009 | Davis et al. |
| 2010/0003596 A1 | 1/2010 | Sato et al. |
| 2011/0151329 A1 | 6/2011 | Bernard et al. |
| 2011/0219607 A1 | 9/2011 | Nanjundaswamy et al. |
| 2011/0220842 A1 | 9/2011 | Nanjundaswamy et al. |
| 2011/0223477 A1 | 9/2011 | Nelson et al. |
| 2011/0223493 A1 | 9/2011 | Nanjundaswamy et al. |

* cited by examiner

METAL-DOPED NICKEL OXIDE ACTIVE MATERIALS

TECHNICAL FIELD

This disclosure relates to cathode active materials, and more particularly to metal-doped nickel (IV)-containing cathode active materials.

BACKGROUND

Batteries, such as alkaline batteries, are commonly used as electrical energy sources. Generally, a battery contains a negative electrode (anode) and a positive electrode (cathode). The negative electrode contains an electroactive material (such as zinc particles) that can be oxidized; and the positive electrode contains an electroactive material (such as manganese dioxide) that can be reduced. The active material of the negative electrode is capable of reducing the active material of the positive electrode. In order to prevent direct reaction of the active material of the negative electrode and the active material of the positive electrode, the electrodes are mechanically and electrically isolated from each other by an ion-permeable separator.

When a battery is used as an electrical energy source for a device, such as a cellular telephone, electrical contact is made to the electrodes, allowing electrons to flow through the device and permitting the oxidation and reduction reactions to occur at the respective electrodes to provide electrical power. An electrolyte solution in contact with the electrodes contains ions that diffuse through the separator between the electrodes to maintain electrical charge balance throughout the battery during discharge.

SUMMARY

This disclosure features metal-doped nickel (IV)-containing cathode active materials, batteries containing the cathode active materials, and a method for improving post-storage performance (i.e., "shelf life") of the batteries.

This disclosure features a method that can improve capacity retention for primary alkaline batteries including a cathode that includes a delithiated, metal-substituted (i.e., metal-doped) Ni(IV)-containing active material, or an unsubstituted Ni(IV) active material. The Ni(IV)-containing active material includes a layered nickel oxide where the Ni ions in the crystal lattice are at least partially substituted by one or more metal ions. The one or more metal ions can help decrease generation of oxygen gas from decomposition of the alkaline electrolyte by Ni(IV) during storage at ambient (e.g., 25° C.) and elevated (e.g., 45° C., 60° C.) temperatures. The metal ions can include transition metal ions and/or non-transition (e.g., main group, rare earth).

The method can include at least one preliminary conditioning step during a battery manufacturing process where, immediately after assembly (e.g., within about one hour of assembly), the battery can be partially discharged at a constant discharge rate (e.g., 5 to 100 mA/g) through an external resistive load for a sufficient period of time so as to consume about 1-15% (e.g., about 5-10%, or about 1-5%) of the total design capacity of the cell. After pre-discharge, the cell can be held for a period of time at ambient temperature (e.g., 25° C.). The battery conditioning can lower the initial OCV, decrease the initial rate of oxygen evolution, and/or decrease the total amount of oxygen generated by decomposition of electrolyte. The batteries can have greater total specific discharge capacity, decreased initial OCV, decreased internal gas pressure, and improved capacity retention after storage for prolonged periods at ambient and elevated temperatures, when compared to alkaline batteries with cathodes including delithiated, non-substituted Ni(IV)-containing layered oxides as active materials.

For example, after pre-conditioning, the OCV value of the Ni(IV)-containing cell can be within a range (e.g., 1.65 to 1.75 V) that is acceptable for consumer alkaline cells. The method can reduce an initial rate of oxygen evolution that can result from a breakdown of an alkaline electrolyte. In some embodiments, capacity retention of pre-discharged Ni(IV)-containing alkaline cells, after storage for 1 week at ambient temperature, can be up to 90% of the fresh capacity (i.e., a capacity measured within 24 hours after assembly). The primary alkaline battery can have decreased internal gas pressure after storage for a prolonged period of time at ambient and elevated temperatures.

In one aspect, the disclosure features a method of making a primary alkaline battery, including partially discharging an assembled battery within about one hour of cell closure; maintaining the partially discharged battery for a period of time ranging from 1 to 24 hours at a temperature in the range of 25 to 70° C. to provide a pre-discharged primary alkaline battery; wherein the pre-discharged battery has an open circuit voltage value of less than or equal to 1.75 V at 25° C.

In another aspect, the disclosure features a battery, including a cathode comprising an oxide having a formula $A_x Ni_{1-y-z-w} Co_y M^a_z M^b_w O_2$; an anode; a separator between the cathode and the anode; and an alkaline electrolyte, wherein A is an alkali metal, $M^a$ is a metal dopant, $M^b$ is a non-metal dopant, $0 \leq x \leq 0.2$, w is 0, or $0 \leq w \leq 0.02$ and $0.02 \leq y+z \leq 0.25$, wherein the battery has an open circuit voltage value of from 1.65 to 1.75 V.

Embodiments of the battery may include one or more of the following features.

In some embodiments, the pre-discharged battery has a capacity retention of at least 95 percent of the capacity of a battery discharged within 24 hours after manufacture, after storage for at least one week at 25° C. The pre-discharged battery can have a capacity retention of at least 90 percent of the capacity of a battery discharged within 24 hours after manufacture, after storage for at least one week at 45° C. The pre-discharged battery can have a capacity retention of at least 85 percent of the capacity of a battery discharged within 24 hours after manufacture, after storage for at least one week at 60° C.

In some embodiments, the pre-discharged battery has a decrease in oxygen evolution of at least 50% compared to a freshly assembled battery.

In some embodiments, the pre-discharged battery has an open circuit voltage value of from 1.65 to 1.75 V at 25° C. The battery can be partially discharged by 15 percent or less of a total battery design capacity within 24 hours after manufacture (e.g., the battery can be partially discharged by 10 percent or less of a total battery design capacity within 24 hours after manufacture, the battery can be partially discharged by 7.5 percent or less of a total battery design capacity within 24 hours after manufacture, the battery can be partially discharged by five percent or less of a total battery design capacity within 24 hours after manufacture). In some embodiments, pre-discharging can include discharging the battery at a continuous drain rate or an intermittent drain rate. The freshly assembled battery can be partially discharged at a low rate of 5 to 100 mA/g of active material within 24 hours after manufacture. In some embodiments, the freshly assembled battery can be partially discharged at a high rate of 10 to 60 mA/g of active material within 24 hours after manufacture. Partially discharging the battery can include a step-wise discharge process.

In some embodiments, partially discharging the battery is performed at 25° C. (e.g., at a temperature of from 20 to 30° C.).

In some embodiments, the battery includes a cathode comprising an oxide having a formula $A_xNi_{1-y-z-w}Co_yM^a_zM^b_wO_2$; an anode; a separator between the cathode and the anode; and an alkaline electrolyte, wherein A is an alkali metal, $M^a$ is a metal dopant, $M^b$ is a non-metal dopant, $0 \leq x \leq 0.2$, w is 0, or $0 \leq w \leq 0.02$ and $0.02 \leq y+z \leq 0.25$.

Embodiments of the battery may include one or more of the following advantages.

The battery can have an average closed circuit voltage of less than about 1.65 V (e.g., greater than about 1.45 V and/or less than about 1.7 V), and can be compatible with devices designed for use with conventional alkaline batteries that include EMD-zinc and nickel oxyhydroxide-zinc. The alkaline battery can have a significantly greater gravimetric specific capacity when compared to commercial primary alkaline batteries that include EMD-zinc and nickel oxyhydroxide-zinc. For example, the alkaline battery can include greater than about 325 mAh/g (e.g., greater than about 350 mAh/g, greater than about 375 mAh/g, greater than about 425 mAh/g, or greater than about 450 mAh/g) when discharged at relative low rates (e.g., <C/30) to a 0.8 V cutoff voltage. The battery can have a better high-rate (e.g., >C/3) performance and comparable or greater capacity retention after storage at ambient room temperature and elevated temperatures, when compared to commercial primary alkaline batteries.

In some embodiments, primary alkaline batteries having cathodes that include a metal-doped Ni(IV)-containing active material can have decreased internal gas pressure after storage compared to batteries that include an undoped Ni(IV)-containing active material. Metal-doping can decrease generation of oxygen gas from decomposition of alkaline electrolyte by Ni(IV)-containing active materials during storage at ambient room temperature and/or at elevated temperatures.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
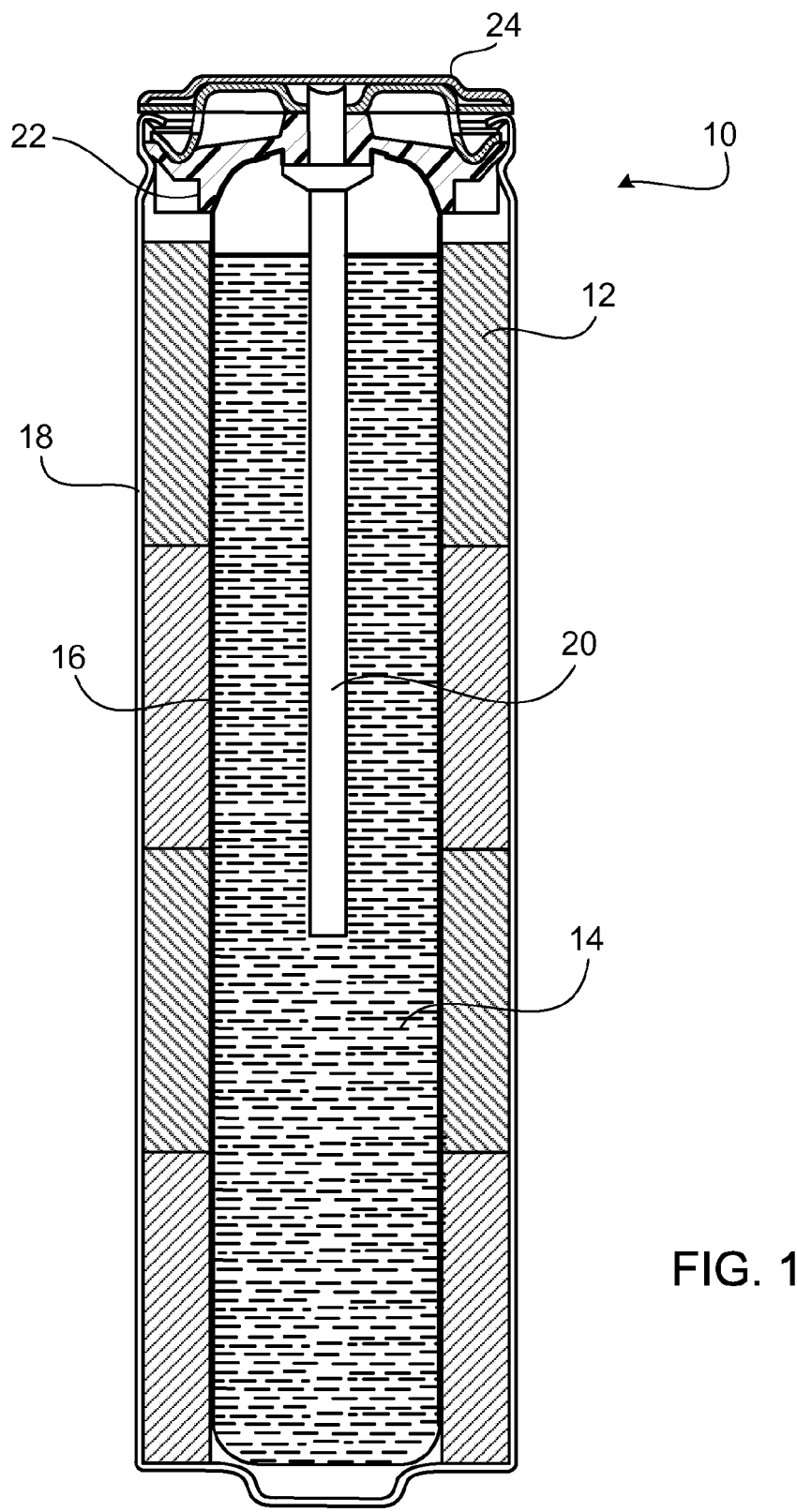
FIG. 1 is a schematic side sectional view of an alkaline primary round cell/battery.

Referring to FIG. 1, a battery 10 includes a cylindrical housing 18, a cathode 12 in the housing, an anode 14 in the housing, and a separator 16 between the cathode and the anode. Battery 10 also includes a current collector 20, a seal 22, and a metal top cap 24, which serves as the negative terminal for the battery. Cathode 12 is in contact with housing 18, and the positive terminal of battery 10 is at the opposite end of battery 10 from the negative terminal. An electrolyte solution, e.g., an alkaline solution, is dispersed throughout battery 10.

Cathode 12 can include an electrochemically active material having a doped alkali-deficient nickel oxide that optionally includes protons, an electrically conductive additive, and optionally a binder.

An undoped alkali-deficient nickel oxide can be an alkali-deficient nickel oxide having a generic formula $A_xNiO_2$, where "A" is an alkali metal ion, and x is less than 1 (e.g., $0 \le x \le 0.2$). In some embodiments, x is between about 0.06 and 0.07. In some embodiments, x is as small as possible to maximize an amount of Ni(IV) in a given alkali-deficient nickel oxide. The undoped alkali-deficient nickel oxide can have a deficiency of alkali metals compared to a nominally stoichiometric compound having a generic formula of $ANiO_2$. The alkali-deficient nickel oxide can contain defects in the crystal lattice, for example, in the case where the alkali metal has deintercalated or leached out of the crystal lattice. In some embodiments, Ni ions can partially occupy alkali metal sites in the crystal lattice. In some embodiments, the alkali metal includes Li, Na, K, Cs, and/or Rb.

In some embodiments, the alkali-deficient nickel oxide can be doped with a dopant metal, such as Co, Mg, Al, Ca, Mn, and/or Y. The metal-doped alkali-deficient nickel oxide can have a general formula of $A_xNi_{1-y-z}Co_yM^a_zO_2$, where A is an alkali metal, $M^a$ is a dopant metal such as Mg, Al, Ca, Mn, and/or Y, $0 \le x \le 0.15$, and $0.02 \le y+z \le 0.25$. $M^a$ can be a single metal or a mixture of metals. In the metal-doped alkali-deficient nickel oxide, Co can be present or absent, and Mg, Al, Ca, Mn, and/or Y can be present or absent; provided that at least one of Co, or an element selected from Mg, Al, Ca, Mn, and Y is present in the alkali-deficient doped nickel oxide. For example, the metal-doped alkali-deficient nickel oxide can have a nominal formula $Li_{0.12}Ni_{0.92}Co_{0.08}O_2$. In some embodiments, the metal-doped alkali-deficient nickel oxide can have a formula of $Li_xNi_{1-y}Co_yO_2$, $Li_xNi_{1-z}Mg_zO_2$, $Li_xNi_{1-y-z}Co_yMg_zO_2$, $Li_xNi_{1-z}Al_zO_2$, $Li_xNi_{1-y-z}Co_yAl_zO_2$, $Li_xNi_{1-z}(Mg, Al)_zO_2$, $Li_xNi_{1-y-z}Co_y(Mg, Al)_zO_2$, $Li_xNi_{1-z}Ca_zO_2$, $Li_xNi_{1-y-z}Co_yCa_zO_2$, $Li_xNi_{1-z}Y_zO_2$, $Li_xNi_{1-y-z}Co_yY_zO_2$, $Li_xNi_{1-z}Mn_zO_2$ or $Li_xNi_{1-y-z}Co_yMn_zO_2$. The dopant (e.g., Co, Mg, Al, Ca, Mn, and/or Y) ion can substitute for Ni ions and/or partially substitute for the alkali ions in the alkali metal sites between the nickel-oxygen layers in the nickel oxide crystal lattice.

In some embodiments, the alkali-deficient nickel oxide can be doped with both a non-metal dopant, such as boron (B), silicon (Si) or germanium (Ge), and a metal dopant, such as Co, Mg, Al, Ca, Mn, and/or Y. The metal and non-metal doped alkali-deficient nickel oxide can have a general formula of $A_xNi_{1-y-z-w}Co_yM^a_zM^b_wO_2$, where A is an alkali metal, $M^a$ is a metal dopant such as Mg, Al, Ca, Mn, and/or Y, $0 \le x \le 0.2$, and $0.02 \le y+z \le 0.25$, and $M^b$ is a non-metal dopant such as B, Si, and/or Ge and $0 \le w \le 0.02$. In some embodiments, x<1 and (y+z)<0.2; or x<1, $0.01 \le y \le 0.2$, and $0.01 \le z \le 0.2$. For example, the metal and non-metal doped alkali-deficient nickel oxide can have a nominal formula $Li_{0.1}Ni_{0.79}Co_{0.15}Al_{0.05}B_{0.01}O_2$.

In some embodiments, in a doped alkali-deficient nickel oxide having a formula of $A_xNi_{1-y-z}Co_yM^a_zO_2$ or $A_xNi_{1-y-z-w}Co_yM^a_zM^b_wO_2$, x is less than or equal to 0.2 (e.g., less than or equal to 0.15, less than or equal to 0.12, less than or equal to 0.1, less than or equal to 0.08, less than or equal to 0.05, or less than or equal to 0.03) and/or greater than or equal to 0 (e.g., greater than or equal to 0.03, greater than or equal to 0.05, greater than or equal 0.08, greater than or equal to 0.1, greater than or equal to 0.12, or greater than or equal to 0.15). In some embodiments, to enhance discharge performance, x is less than 0.3. In some embodiments, at least one of y or z is greater than 0. As an example, y+z is greater than 0 (e.g., greater than or equal to 0.02, greater than or equal to 0.04, greater than or equal to 0.08, greater than or equal to 0.1, greater than or equal to 0.15, greater than or equal to 0.2, or greater than or equal to 0.22) and/or less than or equal to 0.25 (e.g., less than or equal to 0.22, less than or equal to 0.2, less than or equal to 0.15, less than or equal to 0.1, less than or equal to 0.08, less than or equal to 0.04, or less than or equal to 0.02). In some embodiments, y is greater than or equal to 0 (e.g., greater than or equal to 0.02, greater than or equal to 0.04, greater than or equal to 0.08, greater than or equal to 0.1, greater than or equal to 0.12) and/or less than or equal to 0.2 (e.g., less than or equal to 0.15, less than or equal to 0.12, less than or equal to 0.1, less than or equal to 0.08, or less than or equal to 0.04). In some embodiments, z is greater than or equal to 0 (e.g., greater than or equal to 0.02, greater than or equal to 0.03, greater than or equal to 0.04, greater than or equal to 0.05, greater than or equal to 0.06, or greater than or equal to 0.07) and/or less than or equal to 0.1 (e.g., less than or equal to 0.08, less than or equal to 0.07, less than or equal to 0.06, less than or equal to 0.05, less than or equal to 0.04, or less than or equal to 0.03). In some embodiments, w is greater than or equal to 0 (e.g., greater than or equal to 0.005, greater than or equal to 0.01, or greater than or equal to 0.015) and/or less than or equal to 0.02 (less than or equal to 0.015, less than or equal to 0.01, or less than or equal to 0.005).

In some embodiments, when a doped alkali-deficient nickel oxide has three dopants (e.g., two metal dopants and a non-metal dopant, two non-metal dopants and a metal dopant, three metal dopants, three non-metal dopants), the ratio for the three dopants can be, for example, 1:1:1; 2:1:1; 2:2:1; 3:1:1; 3:2:1; 4:1:1; 4:3:3; 5:1:1; 5:2:1; 5:3:2; 5:4:1; or 6:3:1. As an example, a $Co:M^b_1:M^b_2$ ratio can be 1:1:1; 2:1:1; 2:2:1; 3:1:1; 3:2:1; 4:1:1; 4:3:3; 5:1:1; 5:2:1; 5:3:2; 5:4:1; or 6:3:1.

The nickel in an alkali-deficient nickel oxide can have multiple oxidation states. For example, the nickel can have an average positive oxidation state of greater than 3 (e.g., greater than 3.25, greater than 3.5, or greater than 3.8) and/or less than or equal to 4 (e.g., less than 3.8, less than 3.5, less than 3.25, or less than 3.2). The nickel of the alkali-deficient nickel oxide can have a higher average oxidation state than the nickel in a corresponding stoichiometric precursor alkali nickel oxide, prior to removal of alkali metal cation A. In some embodiments, the average oxidation state of the nickel in the alkali-deficient nickel oxide can be 0.3 greater (e.g., 0.5 greater, 0.8 greater, or 0.9 greater) than the average oxidation state of the nickel in the corresponding stoichiometric precursor alkali nickel oxide.

The alkali-deficient nickel oxide including nickel with an average positive oxidation state of greater than 3 can have a layered structure, a spinel-type structure or can include a physical mixture of layered and spinel-type structures, as well as other related crystal structures. As an example, a lithium deficient nickel oxide $Li_xNiO_2$, prepared by delithiation of a layered $LiNiO_2$, can have either a layered structure related to that of the layered $LiNiO_2$ precursor or a spinel-type structure, depending on the stoichiometry and/or heat treatment conditions.

In some embodiments, the alkali-deficient nickel oxides can have a layered crystal structure with alkali metal ions located in interlayer lattice sites located between the nickel-oxygen layers. The alkali-deficient nickel oxides can have defects where alkali metal ions have been extracted. In some embodiments, the alkali metal ions can be partially replaced by protons. The interlayer spacing distance can be either maintained or changed after oxidative de-intercalation of alkali metal ion, proton intercalation, and/or alkali metal ion/proton ion-exchange. In some embodiments, the interlayer spacing can increase due to substitution by alkali ions having larger ionic radii. For example, the interlayer spacing can increase when Li ions are substituted by larger potassium (K) ions, anions, and/or water molecules. In some embodiments, the interlayer spacing in alkali-deficient nickel oxides can increase due to increased electrostatic repulsion between the oxygen-containing layers after alkali removal.

The metal-doped and undoped alkali-deficient nickel oxides can be characterized by measurement of their x-ray powder diffraction patterns, elemental compositions, and average particle sizes. In some embodiments, crystal lattice parameters of doped or undoped alkali-deficient nickel oxide and corresponding stoichiometric precursors can be determined from powder X-ray diffraction ("XRD") patterns. For example, X-ray powder diffraction patterns can be measured with an X-ray diffractometer (e.g., Bruker D-8 Advance X-ray diffractometer, Rigaku Miniflex diffractometer) using $Cu\,K_\alpha$, or $Cr\,K_\alpha$ radiation by standard methods described, for example, by B. D. Cullity and S. R. Stock (*Elements of X-ray Diffraction*, $3^{rd}$ ed., New York: Prentice Hall, 2001). The unit cell parameters can be determined by Rietveld refinement of the powder diffraction data. The X-ray crystallite size also can be determined by analysis of peak broadening in a powder diffraction pattern of a sample containing an internal Si standard using the single-peak Scherrer method or the Warren-Averbach method as discussed in detail, for example, by H. P. Klug and L. E. Alexander (*X-ray Diffraction Procedures for Polycrystalline and Amorphous Materials*, New York: Wiley, 1974, 618-694). In some embodiments, a layered, metal-doped lithium-deficient nickel oxide, for example, $Li_xNi_{1-y-z}Co_yM^a_zO_2$ or $Li_xNi_{1-y-z-w}Co_yM^a_zM^b_wO_2$ can have an X-ray diffraction pattern indicating that interlayer spacing has changed relatively little compared to undoped $LiNiO_2$. For example, the 003 Miller index line at the approximate diffraction angle of $2\theta=18.79°$ can remain almost at the same angle while other Miller index (e.g., hk0) lines can show a larger shift, indicating a relatively minor change in a and/or b unit cell parameters axis of the crystal lattice. The extent of structural distortion also can depend on the average nickel oxidation state, the site occupancy of the lithium ions and protons, as well as total lithium ion/proton content.

In some embodiments, the mean particle size and size distribution for an alkali-deficient nickel oxide and the corresponding precursor alkali nickel oxide can be determined with a laser diffraction particle size analyzer (e.g., a Sympa-Tec Helos particle size analyzer equipped with a Rodos dry powder dispersing unit) using algorithms based on Fraunhofer or Mie theory to compute the volume distribution of particle sizes and mean particle sizes. Particle size distribution and volume distribution calculations are described, for example, in M. Puckhaber and S. Rothele (Powder Handling & Processing, 1999, 11(1), 91-95 and European Cement Magazine, 2000, 18-21). In some embodiments, the alkali nickel oxide precursor can include an agglomerate or a sintered aggregate (i.e., secondary particles) composed of much smaller primary particles. Such agglomerates and aggregates are readily measured using the particle size analyzer. In some embodiments, scanning electron microscopy ("SEM") can be used to determine the morphology and average particle sizes of particles of a nickel oxide.

In some embodiments, the content of the nickel, metal dopants, and alkali metals in doped and undoped alkali-deficient nickel oxides can be determined by, for example, inductively coupled plasma atomic emission spectroscopy ("ICP-AE") and/or atomic absorption spectroscopy ("AA") using standard methods as described, for example, by J. R. Dean (*Practical Inductively Coupled Plasma Spectroscopy*, Chichester, England: Wiley, 2005, 65-87) and B. Welz and M. B. Sperling (*Atomic Absorption Spectrometry*, $3^{rd}$ ed., Weinheim, Germany: Wiley VCH, 1999, 221-294). For example, ICP-AE spectroscopy measurements can be performed using a Thermo Electron Corporation IRIS intrepid II XSP ICP with Cetac ASX-510 autosampler attachment. For some nickel oxide samples including lithium and nickel, ICP-AE analysis can be performed separately for Li ($\lambda=670.784$ nm), Co ($\lambda=228.616$ nm) and Ni ($\lambda=221.647$ nm). Analysis of doped or undoped alkali-deficient nickel oxide samples for metals can be performed by a commercial analytical laboratory, for example, Galbraith Laboratories, Inc. (Knoxyille, Tenn.). Proton content can be analyzed using a type of neutron activation analysis known as PGAA (Prompt Gamma-ray Activation Analysis) at University of Texas—Austin using the general methods described, for example, by G. L. Molnar (*Handbook of Prompt Gamma Activation Analysis*, Dordrecht, The Netherlands: Kluwer Academic Publishers, 2004). The average oxidation state of the nickel and transition metals dopants (e.g., Co, Mn) in the metal-doped lithium nickel oxides can be determined by chemical titrimetry using ferrous ammonium sulfate and standardized potassium permanganate solutions as described, for example, by A. F. Dagget and W. B. Meldrun (Quantitative Analysis, Boston: Heath, 1955, 408-9). The average oxidation state of the transition metals also can be determined indirectly from the specific gravimetric capacity observed for coin cells including the metal-doped lithium-deficient nickel oxide as the cathode active material, Li metal as the anode active material, and a non-aqueous electrolyte solution.

Elemental analyses of selected compositions of doped and undoped alkali nickel oxide powders can be performed. Samples can be measured using inductively coupled plasma atomic emission spectroscopy ("ICP-AE") by a commercial analytical laboratory (e.g., Galbraith Laboratories, Inc., Knoxyille, Tenn.).

True densities of an alkali-deficient nickel oxide and the corresponding precursor nickel oxide can be measured by a He gas pycnometer (e.g., Quantachrome Ultrapyc Model 1200e) as described in general by P. A. Webb ("Volume and Density Determinations for Particle Technologists", Internal Report, Micromeritics Instrument Corp., 2001, pp. 8-9) and in, for example, ASTM Standard D5965-02 ("Standard Test Methods for Specific Gravity of Coating Powders", ASTM International, West Conshohocken, Pa., 2007) and ASTM Standard B923-02 ("Standard Test Method for Metal Powder Skeletal Density by Helium or Nitrogen Pycnometry", ASTM International, West Conshohocken, Pa., 2008). True density is defined, for example, by the British Standards Institute, as the mass of a particle divided by its volume, excluding open and closed pores.

Inclusion of a stabilized delithiated nickel oxide containing tetravalent nickel (i.e., Ni(IV)) in a cathode active material can substantially improve overall discharge performance of primary alkaline batteries compared to batteries including conventional cathode active materials (e.g., electrolytic manganese dioxide (EMD) or β-nickel oxyhydroxide). In some embodiments, alkaline batteries with cathodes including Ni(IV)-containing active materials can exhibit an initial or "fresh" (i.e., measured with 1 hour after cell closure) open circuit voltage (OCV) of greater than about 1.90 V and less than about 2.10 V. Without wishing to be bound by theory, it is believed that alkaline batteries with cathodes including Ni(IV)-containing active materials having a lower OCV (e.g., less than about 1.75 V, less than about 1.70 V) can be advantageous for use with certain battery-powered electronic devices, such as devices designed for use with standard commercial alkaline batteries. In some embodiments, alkaline batteries with cathodes including Ni(IV)-containing active materials can have adequate capacity retention after storage for longer than about 1-2 weeks at ambient room temperature (e.g., or at elevated temperatures such as 45° C. or 60° C.) for extended periods of time (e.g., for one week or longer, two weeks or longer, three weeks or longer), which can provide batteries with a useful shelf life.

In some embodiments, freshly assembled (i.e., within about 1 hour after closure) cells can have an average open circuit voltage (OCV) of about 1.85 V or greater. In other embodiments, the freshly assembled cells can have a closed circuit voltage (CCV) of less than about 1.8 V (e.g., less than about 1.7 V, or less than about 1.6 V). Freshly assembled cells can have a significantly greater gravimetric specific capacity, for example, greater than about 350 mAh/g (e.g., greater than about 375 mAh/g, greater than about 425 mAh/g, or greater than about 450 mAh/g) when discharged at relatively low drain rates (e.g., <C/30 or <C/40) to a 0.8 V cutoff voltage than commercial primary alkaline batteries (e.g., manganese dioxide (EMD)/zinc, or nickel oxyhydroxide/zinc batteries).

In some embodiments, the metal-doped alkali-deficient nickel oxide has a nominal low rate capacity of at least 350 mAh/g (e.g., at least 375 mAh/g) and a high-rate capacity of at least 370 mAh/g (e.g., at least 385 mAh/g) when discharged after storing for 24 hours at 25° C. The metal-doped alkali-deficient nickel oxide can have a low rate capacity of at least 340 mAh/g (e.g., at least 350 mAh/g, at least 360 mAh/g) after storing for one week at 25° C. The metal-doped alkali-deficient nickel oxide can have a nominal low rate capacity of at least 300 mAh/g (e.g., at least 310 mAh/g, at least 315 mAh/g, at least 320 mAh/g, at least 325 mAh/g) after storing for one week at 45° C.

In some embodiments, alkaline cells with cathodes including the metal-doped alkali-deficient nickel oxide have a capacity retention of at least 90 percent (e.g., at least 95%) when discharged at a nominally low rate after storing for one week at 25° C. Alkaline cells with cathodes including the metal-doped alkali-deficient nickel oxide can have a capacity retention of at least 80 percent (e.g., at least 85 percent) when discharged at a nominally low rate after storing for one week at 45° C.

In some embodiments, alkaline batteries with cathodes including a metal-doped alkali-deficient nickel oxide can have decreased internal gas pressure buildup during storage. Without wishing to be bound by theory, it is believed that the gradual buildup of gas pressure during storage can result from generation of oxygen gas due to degradation of the alkaline electrolyte, via oxidation of water by nickel (IV) at high OCV, as shown in Equation 1.

$$Li_xNi(IV)_{1-x}Ni(III)_xO_2+H_2O \rightarrow NiII)(OH)_2+xLi^++\frac{1}{2}O_2 \quad (1)$$

An increase in the internal gas pressure of a cell can be undesirable, as product safety can be compromised for the consumer. For example, an increase in internal pressure can cause the battery to leak and/or vent if the gas pressure becomes sufficiently high. In some embodiments, decreasing the initial OCV of alkaline primary batteries having cathodes including metal-doped alkali-deficient nickel oxide cathode active materials can decrease the overall rate of oxygen generation, resulting in less gas pressure buildup during long term storage.

In some embodiments, the metal-doped alkali-deficient nickel oxide powder has a cumulative oxygen evolution volume after storing for three weeks at 25° C. in alkaline electrolyte solution of less than 5 cm$^3$/g (e.g., less than 6 cm$^3$/g, less than 7 cm$^3$/g). In some embodiments, the corresponding value for undoped alkali-deficient nickel oxide powder is greater than 8.5 cm$^3$/g.

In general, an alkali-deficient nickel oxide can be prepared by treatment of a layered lithium nickel oxide precursor having a nominal stoichiometric formula of LiNiO$_2$ with a 2-12 M aqueous solution of a strong mineral acid (e.g., sulfuric acid, nitric acid, hydrochloric acid) at a temperature below ambient room temperature (e.g., between about 0 and 5° C.) for various periods of times ranging between 20 and 60 hours. Nearly all the lithium ions can be extracted from the interlayer regions between the Ni-oxygen layers in the crystal lattice. A suitable layered lithium nickel oxide precursor having specific physicochemical properties can be synthesized from a commercial spherical nickel hydroxide by any of several methods including both high and low temperature processes. For example, a layered lithium nickel oxide precursor can be synthesized by procedures described by Ohzuku and co-workers (J. Electrochem. Soc., 1993, 140, 1862); Ebner and co-workers (Solid State Ionics, 1994, 69, 238); U.S. Pat. Nos. 4,980,080; 5,180,574; 5,629,110; and 5,264,201, each herein incorporated by reference in its entirety. A layered lithium nickel oxide precursor having at least a portion of the Ni ions substituted by one or more other metal or non-metal ions can be prepared, for example, via a solid state reaction of a mixture of suitable metal-containing precursor powders, as described, for example, in U.S. Pat. No. 4,980,080, U.S. Pat. No. 5,629,110, U.S. Pat. No. 5,955,051, U.S. Pat. No. 5,720,932, U.S. Pat. No. 6,274,270, and U.S. Pat. No. 6,335,119, each herein incorporated by reference in its entirety. The metal ions can be transition metal ions (e.g., Co, Mn, Y), alkaline earth metal ions (e.g., Ca, Mg), or main group metal ions (e.g., Al). Non-metal ions (e.g., B, Si, Ge) also can be substituted for Ni ions and/or Li ions.

In some embodiments, to prepare an undoped lithium nickel oxide, an undoped β-nickel oxyhydroxide can be mixed with a stoichiometric amount (i.e., 1:1) of lithium hydroxide monohydrate (LiOH.H$_2$O) using a high energy milling process (e.g., a high-energy shaker mill, a planetary mill, a stirred ball mill, a small media mill). The mixture can be heated sequentially at two different treatment temperatures in flowing oxygen gas. For example, initially, the mixture can be heated to about 210° C. (about 0.5° C./min), held for at temperature for 16-20 hours, and then allowed to furnace cool (in an oxygen flow) to ambient room temperature. Next, the mixture can be re-milled, heated to about 800° C. (0.5° C./min) with, for example, two intermediate temperature soaks (i.e., at about 105° C. for 30 minutes; at about 350°

C. for 3 hours), held at about 800° C. for 48 hours, and finally allowed to furnace cool to ambient room temperature.

In some embodiments, to prepare the multi-metal-doped lithium nickel oxide, an undoped β-nickel oxyhydroxide powder and selected metal ion sources, for example, aluminum metal powder, aluminum hydroxide (e.g., Al(OH)$_3$), cobalt oxide (e.g., Co$_3$O$_4$), cobalt carbonate (CoCO$_3$), magnesium oxide (MgO), calcium oxide (CaO), calcium hydroxide (Ca(OH)$_2$), calcium carbonate (CaCO$_3$), yttrium hydroxide (Y(OH)$_3$), manganese oxide (e.g., MnO, Mn$_2$O$_3$, MnO$_2$), manganese carbonate (MnCO$_3$), and/or lithium hydroxide monohydrate in specified stoichiometric ratios can be mixed by a high-energy milling process. The stoichiometries of the compositions can be selected according to composition diagrams corresponding to selected ternary lithium metal-dopant nickel oxide systems, for example, LiNi$_{1-y-z}$Co$_y$Mg$_z$O$_2$ and LiNi$_{1-y-z}$Co$_y$Al$_z$O$_2$. The high-energy milled mixtures including nickel oxyhydroxide and various metal ion sources serving as precursors to the metal-doped lithium nickel oxides can be heated as above for the undoped lithium nickel oxide.

In some embodiments, at least a portion of the Ni ions in a layered lithium nickel oxide precursor can be substituted by one or more non-metal ions (e.g., B, Si, Ge). A mixed metal and nonmetal-doped lithium nickel oxide can be prepared by blending an undoped β-nickel oxyhydroxide powder, selected metal sources, and selected nonmetal sources, for example, boron oxide (B$_2$O$_3$), silicon powder (Si), silicon dioxide (SiO$_2$), germanium powder (Ge), germanium dioxide (GeO$_2$) and/or lithium hydroxide monohydrate in specified stoichiometric ratios and thoroughly mixing by a high-energy milling process. The high-energy milled mixtures including the nickel oxyhydroxide and the various nonmetal and metal sources serving as precursors to the mixed nonmetal and metal-doped lithium nickel oxides can be heated as above for the metal-doped lithium nickel oxides.

In some embodiments, the doped alkali nickel oxides can be prepared via a modified solid-state process. For example, the nickel source material can be a commercial spherical β-nickel oxyhydroxide powder that is either undoped, or where the nickel is partially substituted by about 2-3 atomic % cobalt. The β-nickel oxyhydroxide can be prepared by chemical oxidation of β-nickel hydroxide as follows. An excess of solid sodium peroxydisulfate Na$_2$S$_2$O$_8$ can be added in portions to a stirred slurry of a commercial spherical cobalt-substituted (or unsubstituted) β-nickel hydroxide powder in de-ionized water at about 30-40° C. The mixture can then be heated to about 50-60° C. and stirred for about 15 hours with incremental addition of portions of aqueous NaOH solution or solid powder to maintain pH in the range of 8<pH<12 (e.g., at about 10). Next, the stirring and heating can be stopped and the resulting suspension of black particles can be allowed to settle (e.g., 1-4 hours). A clear supernatant liquid can be removed and the particles can be re-suspended in a fresh aliquot of water (e.g., de-ionized water). This suspension can be stirred for 5-30 minutes, allowed to settle, the supernatant removed, and the entire process can be repeated until the pH of the supernatant is nearly neutral (e.g., 6<pH<8, or about 7). The washed β-nickel oxyhydroxide solid product can be dried in air at about 80-100° C.

In some embodiments, preparation of Ni(IV)-containing cathode active materials requires removal of most of the interlayer Li ions from the layered lithium nickel oxide precursors. In some embodiments, the Li ions are chemically extracted via an oxidative delithiation process. Oxidative delithiation of a layered lithium nickel oxide can take place via a proton catalyzed aqueous disproportionation process such as that described in Equation 2 and as reported by H. Arai and coworkers (J. Solid State Chem., 2002, 163, 340-9). For example, treatment of a layered lithium nickel oxide powder with an aqueous 6M H$_2$SO$_4$ solution at very low pH can cause Ni(III) ions on the surfaces of the particles to disproportionate into equal numbers of Ni(II) and Ni(IV) ions.

$$2LiNi^{+3}O_2 + 4H^+ \rightarrow Ni^{+4}O_2 + Ni^{+2} + 2Li^+ + 2H_2O \quad (2)$$

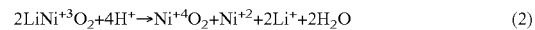

The Ni(II) ions can dissolve in the acid solution whereas the Ni(IV) ions are insoluble and can remain in the solid phase.

In some embodiments, ionic exchange of Li ions by protons can take place via hydrolysis such as described in Equation 3. However, the introduction of protons into lattice sites formerly occupied by Li ions in the interlayer region can be undesirable since these protons can remain in the lattice even after acid treatment, and inhibit the disproportionation reaction. Further, these protons can interfere with solid state diffusion of protons inserted during discharge of cells including the lithium deficient nickel oxide as active cathode material as well as limit total discharge capacity.

$$LiNi^{+3}O_2 + H_2O \rightarrow H_xLi_{(1-x)}Ni^{+3}O_2 + xLiOH \quad (3)$$

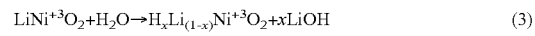

An improved process for oxidative delithiation of metal-substituted layered lithium nickel oxides by treatment with an aqueous solution of a mineral acid at a relatively low temperature (e.g., between 0° C. and 5° C.) was described, for example, in U.S. application Ser. No. 12/722,669. After treatment by the low-temperature acid washing process in U.S. application Ser. No. 12/722,669, the isolated solid product can exhibit a total weight loss of about 50% relative to the initial dry weight of the corresponding metal-substituted LiNi$_{1-y-z}$Co$_y$M$_z$O$_2$ phase. This weight loss can be attributed to, for example, the partial dissolution of Ni(II) ions as well as the extraction of Li$^+$ ions. Dissolution of Ni$^{+2}$ ions from the surface of the lithium nickel oxide particles can increase particle porosity thereby increasing exposure of Ni$^{+3}$ ions inside the particles to acid and resulting additional disproportionation. An increase in the amount of disproportionation can serve to raise the average Ni oxidation state. In some embodiments, the alkali-deficient nickel oxide is prepared as described, for example, in U.S. Application U.S. Ser. No. 12/722,669, herein incorporated by reference in its entirety.

In some embodiments, the alkali-deficient nickel oxide includes protons. For example, the alkali-deficient nickel oxide can include protons at a stoichiometric ratio of between 0.01 and 0.2 atomic percent.

X-ray powder diffraction patterns of selected compositions of delithiated metal substituted nickel oxide powders can be measured in the same manner as the corresponding metal substituted lithium nickel oxides. The observed patterns can be consistent with those reported previously, for example, by H. Arai et al. (e.g., J. Solid State Chem., 2002, 163, 340-9) and also L. Croguennec et al. (e.g., J. Mater. Chem., 2001, 11, 131-41) for other chemically delithiated layered nickel oxides having various compositions. The experimental patterns can be consistent with that reported by T. Ohzuku et al. (e.g., J. Electrochem. Soc., 1993, 140, 1862) for a comparable sample of delithiated nickel oxide.

The alkali-deficient nickel oxide resulting from repeated acid treatment can have greater purity, greater B.E.T. specific surface area, and/or larger average pore diameter relative to the alkali metal-containing precursor nickel oxide. The specific surface areas of an alkali-deficient nickel oxide and the corresponding precursor nickel oxide can be determined by the multipoint B.E.T. N$_2$ adsorption isotherm method described, for example, by P. W. Atkins (*Physical Chemistry*, 5$^{th}$ edn., New York: W. H. Freeman & Co., 1994, pp. 990-992)

and S. Lowell et al. (*Characterization of Porous Solids and Powders: Powder Surface Area and Porosity*, Dordrecht, The Netherlands: Springer, 2006, pp. 58-80). The B.E.T. surface area method measures the total surface area on the exterior surfaces of particles and includes that portion of the surface area defined by open pores within the particle accessible for gas adsorption and desorption. In some embodiments, the specific surface area of the alkali-deficient nickel oxide can be substantially greater than that of the precursor nickel oxide. An increase in specific surface area can be correlated with an increase in surface roughness and porosity, which also can be assessed by analyzing the microstructure of the nickel oxide particles as imaged by scanning electron microscopy (e.g., SEM micrographs at about 10,000× magnification). Porosimetric measurements can be performed on the nickel oxide powders to determine cumulative pore volumes, average pore sizes (i.e., diameters), and pore size distributions. Pore sizes and pore size distributions can be calculated by applying various models and computational methods (e.g., BJH, DH, DR, HK, SF, etc.) to analyze the data from the measurement of $N_2$ adsorption and/or desorption isotherms, as discussed, for example, by S. Lowell et al. (*Characterization of Porous Solids and Powders: Powder Surface Area and Porosity*, Dordrecht, The Netherlands: Springer, 2006, pp. 101-156).

In some embodiments, cathode 12 can include between 50 percent and 95 percent by weight (e.g., between 60 percent and 90 percent by weight, between 70 percent and 85 percent by weight) of the cathode active material. Cathode 12 can include greater than or equal to 50, 60, 70, 80, or 90 percent by weight, and/or less than or equal to 95, 90, 80, 70, or 60 percent by weight of the cathode active material. Cathode 12 can include one or more (e.g., two, three or more) doped and/or undoped alkali-deficient nickel oxides, in any combination. For example, cathode 12 can include a mixture of $Li_xNi_{1-y}Co_yO_2$, $Li_xNi_{1-y-z}Co_yM^a_zO_2$, $Li_xNi_{1-y-z-w}Co_yM^a_zM^b_wO_2$, and/or $Li_xNiO_2$, where $M^a$ is Ca, Mg, Al, Y and/or Mn.

One or more alkali-deficient nickel oxides can make up all of the active material of cathode 12, or a portion of the active material of cathode 12. In a cathode including a mixture or blend of active materials, the active materials can include greater than about one percent to less than about 100 percent by weight of the alkali-deficient nickel oxide. For example, cathode 12 can include greater than 0%, 1%, 5%, 10%, 20%, 50%, or 70% by weight of the alkali-deficient nickel oxide(s); and/or less than or equal to about 100%, 70%, 50%, 20%, 10%, 5%, or 1% by weight of the alkali-deficient nickel oxide(s). Other examples of suitable cathode active materials that can be used in combination with the alkali-deficient nickel oxide(s) can be selected from $\gamma$-$MnO_2$ (e.g., EMD, CMD), $\beta$-NiOOH, $\gamma$-NiOOH, AgO, $Ag_2O$, $AgNiO_2$, $AgCoO_2$, $AgCo_xNi_{1-x}O_2$, $AgCuO_2$, $Ag_2Cu_2O_3$, and combinations thereof.

In some embodiments, cathode 12 can include an electrically conductive additive capable of enhancing the bulk electrical conductivity of cathode 12. Examples of conductive additives include graphite, carbon black, silver powder, gold powder, nickel powder, carbon fibers, carbon nanofibers, carbon nanotubes, acetylene black, manganese dioxide, cobalt oxide, cobalt oxyhydroxide, silver oxide, silver nickel oxide, nickel oxyhydroxide, and indium oxide. Preferred conductive additives include graphite particles, graphitized carbon black particles, carbon nanofibers, vapor phase grown carbon fibers, and single and multiwall carbon nanotubes. In certain embodiments, the graphite particles can be non-synthetic (i.e., "natural"), nonexpanded graphite particles, for example, NdG MP-0702X available from Nacional de Grafite (Itapecirica, Brazil) and Formula BT™ grade available from Superior Graphite Co. (Chicago, Ill.). In other embodiments, the graphite particles can be expanded natural or synthetic graphite particles, for example, Timrex® BNB90 available from Timcal, Ltd. (Bodio, Switzerland), WH20 or WH20A grade from Chuetsu Graphite Works Co., Ltd. (Osaka, Japan), and ABG grade available from Superior Graphite Co. (Chicago, Ill.). In yet other embodiments, the graphite particles can be synthetic, non-expanded graphite particles, for example, Timrex® KS4, KS6, KS15, MX15 available from Timcal, Ltd. (Bodio, Switzerland). The graphite particles can be oxidation-resistant synthetic, non-expanded graphite particles. The term "oxidation resistant graphite" as used herein refers to a synthetic graphite made from high purity carbon or carbonaceous materials having a highly crystalline structure. Suitable oxidation resistant graphites include, for example, SFG4, SFG6, SFG10, SFG15 available from Timcal, Ltd., (Bodio, Switzerland). The use of oxidation resistant graphite in blends with another strongly oxidizing cathode active material, nickel oxyhydroxide, is disclosed in commonly assigned U.S. Ser. No. 11/820,781, filed Jun. 20, 2007. Carbon nanofibers are described, for example, in commonly-assigned U.S. Pat. No. 6,858,349 and U.S. Patent Application Publication No. US 2002-0172867A1. Cathode 12 can include between 3% and 35%, between 4% and 20%, between 5% and 10%, or between 6% and 8% by weight of conductive additive.

An optional binder can be added to cathode 12 to enhance structural integrity. Examples of binders include polymers such as polyethylene powders, polypropylene powders, polyacrylamides, and various fluorocarbon resins, for example polyvinylidene difluoride (PVDF) and polytetrafluoroethylene (PTFE). An example of a suitable polyethylene binder is available from Dupont Polymer Powders (Sàri, Switzerland) under the tradename Coathylene HX1681. The cathode 12 can include, for example, from 0.05% to 5% or from 0.1% to 2% by weight binder relative to the total weight of the cathode. Cathode 12 can also include other optional additives.

The electrolyte solution also is dispersed throughout cathode 12, e.g., at about 5-7 percent by weight. Weight percentages provided above and below are determined after the electrolyte solution was dispersed in cathode 12. The electrolyte solution can be any of the electrolyte solutions commonly used in alkaline batteries. The electrolyte solution can be an alkaline solution, such as an aqueous alkali metal hydroxide solution, e.g., LiOH, NaOH, KOH, or mixtures of alkali metal hydroxide solutions (e.g., KOH and NaOH, KOH and LiOH). For example, the aqueous alkali metal hydroxide solution can include between about 33 and about 45 percent by weight of the alkali metal hydroxide, such as about 9 N KOH (i.e., about 37% by weight KOH). In some embodiments, the electrolyte solution also can include up to about 6 percent by weight zinc oxide, e.g., about 2 percent by weight zinc oxide.

Anode 14 can be formed of any of the zinc-based materials conventionally used in alkaline battery zinc anodes. For example, anode 14 can be a gelled zinc anode that includes zinc metal particles and/or zinc alloy particles, a gelling agent, and minor amounts of additives, such as a gassing inhibitor. A portion of the electrolyte solution can be dispersed throughout the anode. The zinc particles can be any of the zinc-based particles conventionally used in gelled zinc anodes. The zinc-based particles can be formed of a zinc-based material, for example, zinc or a zinc alloy. Generally, a zinc-based particle formed of a zinc-alloy is greater than 75% zinc by weight, generally greater than 99.9% by weight zinc. The zinc alloy can include zinc (Zn) and at least one of the following elements: indium (In), bismuth (Bi), aluminum (Al), calcium (Ca), gallium (Ga), lithium (Li), magnesium (Mg), and tin (Sn). The zinc alloy generally is composed primarily of zinc and preferably can include metals that can inhibit gassing, such as indium, bismuth, aluminum and mixtures thereof. As used herein, gassing refers to the evolution of hydrogen gas resulting from a reaction of zinc metal or zinc alloy with the electrolyte. The presence of hydrogen gas inside a sealed battery is undesirable because a pressure buildup can cause leakage of electrolyte. Preferred zinc-based particles are both essentially mercury-free and lead-free. Examples of zinc-based particles include those described in U.S. Pat. Nos. 6,284,410; 6,472,103; 6,521,378; and commonly-assigned U.S. application Ser. No. 11/001,693, filed Dec. 1, 2004, all hereby incorporated by reference. The terms "zinc", "zinc powder", or "zinc-based particle" as used herein shall be understood to include zinc alloy powder having a high relative concentration of zinc and as such functions electrochemically essentially as pure zinc. The anode can include, for example, between about 60% and about 80%, between about 62% and 75%, between about 63% and about 72%, or between about 67% and about 71% by weight of zinc-based particles. For example, the anode can include less than about 72%, about 70%, about 68%, about 64%, or about 60%, by weight zinc-based particles.

The zinc-based particles can be formed by various spun or air blown processes. The zinc-based particles can be spherical or non-spherical in shape. Non-spherical particles can be acicular in shape (i.e., having a length along a major axis at least two times a length along a minor axis) or flake-like in shape (i.e., having a thickness not more than 20% of the length of the maximum linear dimension). The surfaces of the zinc-based particles can be smooth or rough. As used herein, a "zinc-based particle" refers to a single or primary particle of a zinc-based material rather than an agglomeration or aggregation of more than one particle. A percentage of the zinc-based particles can be zinc fines. As used herein, zinc fines include zinc-based particles small enough to pass through a sieve of 200 mesh size (i.e., a sieve having a Tyler standard mesh size corresponding to a U.S. Standard sieve having square openings of 0.075 mm on a side) during a normal sieving operation (i.e., with the sieve shaken manually). Zinc fines capable of passing through a 200 mesh sieve can have a mean average particle size from about 1 to 75 microns, for example, about 75 microns. The percentage of zinc fines (i.e., −200 mesh) can make up about 10 percent, 25 percent, 50 percent, 75 percent, 80 percent, 90 percent, 95 percent, 99 percent or 100 percent by weight of the total zinc-based particles. A percentage of the zinc-based particles can be zinc dust small enough to pass through a 325 mesh size sieve (i.e., a sieve having a Tyler standard mesh size corresponding to a U.S. Standard sieve having square openings of 0.045 mm on a side) during a normal sieving operation. Zinc dust capable of passing through a 325 mesh sieve can have a mean average particle size from about 1 to 35 microns (for example, about 35 microns). The percentage of zinc dust can make up about 10 percent, 25 percent, 50 percent, 75 percent, 80 percent, 90 percent, 95 percent, 99 percent or 100 percent by weight of the total zinc-based particles. Even very small amounts of zinc fines, for example, at least about 5 weight percent, or at least about 1 weight percent of the total zinc-based particles can have a beneficial effect on anode performance. The total zinc-based particles in the anode can consist of only zinc fines, of no zinc fines, or mixtures of zinc fines and dust (e.g., from about 35 to about 75 weight percent) along with larger size (e.g., −20 to +200 mesh) zinc-based particles. A mixture of zinc-based particles can provide good overall performance with respect to rate capability of the anode for a broad spectrum of discharge rate requirements as well as provide good storage characteristics. To improve performance at high discharge rates after storage, a substantial percentage of zinc fines and/or zinc dust can be included in the anode.

Anode 14 can include gelling agents, for example, a high molecular weight polymer that can provide a network to suspend the zinc particles in the electrolyte. Examples of gelling agents include polyacrylic acids, grafted starch materials, salts of polyacrylic acids, polyacrylates, carboxymethylcellulose, a salt of a carboxymethylcellulose (e.g., sodium carboxymethylcellulose) or combinations thereof. Examples of polyacrylic acids include Carbopol 940 and 934 available from B.F. Goodrich Corp. and Polygel 4P available from 3V. An example of a grafted starch material is Waterlock A221 or A220 available from Grain Processing Corp. (Muscatine, Iowa). An example of a salt of a polyacrylic acid is Alcosorb G1 available from Ciba Specialties. The anode can include, for example, between about 0.05% and 2% by weight or between about 0.1% and 1% by weight of the gelling agent by weight.

Gassing inhibitors can include a metal, such as bismuth, tin, indium, aluminum or a mixture or alloys thereof. A gassing inhibitor also can include an inorganic compound, such as a metal salt, for example, an indium or bismuth salt (e.g., indium sulfate, indium chloride, bismuth nitrate). Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for primary alkaline battery separators. In some embodiments, separator 16 can be formed of two layers of a non-woven, non-membrane material with one layer being disposed along a surface of the other. To minimize the volume of separator 16 while providing an efficient battery, each layer of non-woven, non-membrane material can have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Generally, the layers can be substantially devoid of fillers, such as inorganic particles. In some embodiments, the separator can include inorganic particles. In other embodiments, separator 16 can include a layer of cellophane combined with a layer of non-woven material. The separator optionally can include an additional layer of non-woven material. The cellophane layer can be adjacent to cathode 12. Preferably, the non-woven material can contain from about 78% to 82% by weight polyvinylalcohol (PVA) and from about 18% to 22% by weight rayon and a trace amount of surfactant. Such non-woven materials are available from PDM under the tradename PA25. An example of a separator including a layer of cellophane laminated to one or more layers of a non-woven material is Duralam DT225 available from Duracell Inc. (Aarschot, Belgium).

In yet other embodiments, separator 16 can be an ion-selective separator. An ion-selective separator can include a microporous membrane with an ion-selective polymeric coating. In some cases, such as in rechargeable alkaline manganese dioxide cells, diffusion of soluble zincate ion, i.e., $[Zn(OH)_4]^{2-}$, from the anode to the cathode can interfere with the reduction and oxidation of manganese dioxide, thereby resulting in a loss of coulombic efficiency and ultimately in decreased cycle life. Separators that can selectively inhibit the passage of zincate ions, while allowing free passage of hydroxide ions are described in U.S. Pat. Nos. 5,798,180 and 5,910,366. An example of a separator includes a polymeric substrate having a wettable cellulose acetate-coated polypropylene microporous membrane (e.g., Celgard® 3559, Celgard® 5550, Celgard® 2500, and the like) and an ion-selective coating applied to at least one surface of the substrate. Suitable ion-selective coatings include polyaromatic ethers (such as a sulfonated derivative of poly(2,6-dimethyl-1,4-phenyleneoxide)) having a finite number of recurring monomeric phenylene units each of which can be substituted with one or more lower alkyl or phenyl groups and a sulfonic acid or carboxylic acid group. In addition to preventing migration of zincate ions to the manganese dioxide cathode, the selective separator was described in U.S. Pat. Nos. 5,798,180 and 5,910,366 as capable of diminishing diffusion of soluble ionic species away from the cathode during discharge Alternatively or in addition, the separator can prevent substantial diffusion of soluble ionic metal species (e.g., $Ag^+$, $Ag^{2+}$, $Cu^+$, $Cu^{2+}$, $Bi^{5+}$, and/or $Bi^{3+}$) away from the cathode to the zinc anode, such as the separator described in U.S. Pat. No. 5,952,124. The separator can include a substrate membrane such as cellophane, nylon (e.g., Pellon® sold by Freundenburg, Inc.), microporous polypropylene (e.g., Celgard® 3559 sold by Celgard, Inc.) or a composite material including a dispersion of a carboxylic ion-exchange material in a microporous acrylic copolymer (e.g., PD2193 sold by Pall-RAI, Inc.). The separator can further include a polymeric coating thereon including a sulfonated polyaromatic ether, as described in U.S. Pat. Nos. 5,798,180; 5,910,366; and 5,952,124.

In other embodiments, separator 16 can include an adsorptive or trapping layer. Such a layer can include inorganic particles that can form an insoluble compound or an insoluble complex with soluble transition metal species to limit diffusion of the soluble transition metal species through the separator to the anode. The inorganic particles can include metal oxide nanoparticles, for example, as $ZrO_2$ and $TiO_2$. Although such an adsorptive separator can attenuate the concentration of the soluble transition metal species, it may become saturated and lose effectiveness when high concentrations of soluble metal species are adsorbed. An example of such an adsorptive separator is disclosed in commonly assigned U.S. Pat. Nos. 7,914,920 and 8,048,556.

Battery housing 18 can be any conventional housing commonly used for primary alkaline batteries. The battery housing 18 can be fabricated from metal, for example, nickel-plated cold-rolled steel. The housing generally includes an inner electrically-conductive metal wall and an outer electrically non-conductive material such as heat shrinkable plastic. An additional layer of conductive material can be disposed between the inner wall of the battery housing 18 and cathode 12. This layer may be disposed along the inner surface of the wall, along the circumference of cathode 12 or both. This conductive layer can be applied to the inner wall of the battery, for example, as a paint or dispersion including a carbonaceous material, a polymeric binder, and one or more solvents. The carbonaceous material can be carbon particles, for example, carbon black, partially graphitized carbon black or graphite particles. Such materials include LB1000 (Timcal, Ltd.), Eccocoat 257 (W. R. Grace & Co.), Electrodag 109 (Acheson Colloids, Co.), Electrodag 112 (Acheson), and EB0005 (Acheson). Methods of applying the conductive layer are disclosed in, for example, Canadian Patent No. 1,263,697, which is hereby incorporated by reference.

The anode current collector 20 passes through seal 22 extending into anode 14. Current collector 20 is made from a suitable metal, such as brass or brass-plated steel. The upper end of current collector 20 electrically contacts the negative top cap 24. Seal 22 can be made, for example, of nylon.

Battery 10 can be assembled using conventional methods and hermetically sealed by a mechanical crimping process. In some embodiments, positive electrode 12 can be formed by a pack and drill method, described in U.S. Ser. No. 09/645,632, filed Aug. 24, 2000.

Battery 10 is pre-discharged by discharging less than or equal to 10% (e.g., less than or equal to nine percent, less than or equal to eight percent, less than or equal to 7.5 percent, less than or equal to six percent, less than or equal to five percent, less than or equal to four percent, less than or equal to three percent, less than or equal to two percent, or less than or equal to one percent) of the total design capacity of the battery within about 1 hour (e.g., 0.75 hour, 1 hour, 1.5 hours, 2 hours) after assembly is completed. In some embodiments, pre-discharge can occur on a cathode prior to incorporation into a battery. The battery can be pre-discharged at constant drain rates ranging from less than 7.5 mA/g (i.e., of active material) to more than 60 mA/g (e.g., 5 mA/g to 100 mA/g). The current drain during pre-discharge can be either constant or intermittent (i.e., pulsed) in nature, or a combination thereof. The pre-discharge can be performed continuously or in discrete steps and can also include one or more rest intervals during which no discharge takes place. The pre-discharge can be performed completely or in part at ambient temperature (e.g., 20-30° C.) as well as at elevated temperatures (e.g., 40-70° C.).

Battery 10 can be a primary electrochemical cell or in some embodiments, a secondary electrochemical cell. Primary batteries are meant to be discharged (e.g., to exhaustion) only once, and then discarded. In other words, primary batteries are not intended to be recharged. Primary batteries are described, for example, by D. Linden and T. B. Reddy (*Handbook of Batteries*, $3^{rd}$ ed., New York: McGraw-Hill Co., Inc., 2002). In contrast, secondary batteries can be recharged many times (e.g., more than fifty times, more than a hundred times, more than a thousand times). In some cases, secondary batteries can include relatively robust separators, such as those having many layers and/or that are relatively thick. Secondary batteries can also be designed to accommodate changes, such as swelling, that can occur in the batteries. Secondary batteries are described, for example, by T. R. Crompton (*Battery Reference Book*, $3^{rd}$ ed., Oxford: Reed Educational and Professional Publishing, Ltd., 2000) and D. Linden and T. B. Reddy (*Handbook of Batteries*, $3^{rd}$ ed., New York: McGraw-Hill Co., Inc., 2002).

Battery 10 can have any of a number of different nominal discharge voltages (e.g., 1.2 V, 1.5 V, 1.65 V), and/or can be, for example, a AA, AAA, AAAA, C, or D battery. While battery 10 can be cylindrical, in some embodiments, battery 10 can be non-cylindrical. For example, battery 10 can be a coin cell, a button cell, a wafer cell, or a racetrack-shaped cell. In some embodiments, a battery can be prismatic. In certain embodiments, a battery can have a rigid laminar cell configuration or a flexible pouch, envelope or bag cell configuration. In some embodiments, a battery can have a spirally wound configuration, or a flat plate configuration. Batteries are described, for example, in U.S. Pat. No. 6,783,893; U.S. Patent Application Publication No. 2007/0248879 A1, filed on Jun. 20, 2007; and U.S. Pat. No. 7,435,395.

The following examples are illustrative and not intended to be limiting.

EXAMPLES

Example 1

Synthesis of $LiNiO_2$

A stoichiometric lithium nickel oxide, $LiNiO_2$ was synthesized by blending 93.91 g of a commercial spherical β-nickel oxyhydroxide powder (e.g., β-NiOOH, Kansai Catalyst Co.) and 42.97 g of a monohydrated lithium hydroxide (LiOH.H$_2$O, Aldrich Chemical) and heating the mixture at about 210° C. in a tube furnace for about 20 hours under an oxygen gas flow. The heated mixture was allowed to furnace cool to ambient room temperature, ground with a mortar and pestle, and re-heated at 800° C. for an additional 48 hours under flowing oxygen gas. The x-ray powder diffraction pattern of the final reaction product corresponded closely to that reported for stoichiometric $LiNiO_2$ (e.g., ICDD PDF No. 09-0063), as described, for example, in U.S. Pat. No. 5,720,932, J. Maruta et al. (Journal of Power Sources, 2000, 90, 89-94) and Y. Sun et al. (Solid State Ionics, 2006, 177, 1173-7).

Example 2

Synthesis of delithiated $Li_xNiO_2$

The lithium nickelate of Example 1 was delithiated by a low-temperature acid treatment process similar to that disclosed in Example 1 of U.S. application Ser. No. 12/722,669, herein incorporated in its entirety. Specifically, approximately 100 g of $LiNiO_2$ was added to 1.5 L of a rapidly stirred aqueous 6 M $H_2SO_4$ solution cooled to between 0 and 5° C. The resulting slurry is stirred and maintained at about 2° C. for either about 20 hours (Ex. 2a) or 40 hours (Ex. 2b). Next, the suspended solids were allowed to settle, the supernatant liquid removed by decantation, and the solid washed with aliquots of de-ionized water until the pH of the supernatant was nearly neutral (i.e., pH ~6-7). The solid was collected by either pressure or vacuum filtration and dried at about 80° C. in air for about 24 hours. The residual lithium content of the dried, delithiated $Li_xNiO_2$ product was determined by ICP spectroscopy to be about 2.2 wt % Li, corresponding to x=0.31 (Ex. 2a) and less than about 0.4 wt % Li, corresponding to x=0.06 (Ex. 2b). The x-ray powder diffraction pattern of the delithiated product was similar to that of the stoichiometric $LiNiO_2$ with the expected shifts in the positions of the diffraction peaks to higher 2θ angles. Average particle size of the delithiated $Li_xNiO_2$ powder ranged from about 1 to 8 μm and the B.E.T. specific surface area was about 1.36 m$^2$/g. The true density of the $Li_xNiO_2$ powder was measured by He pycnometer as 4.70 g/cm$^3$.

The electrochemical discharge performance of the delithiated $Li_xNiO_2$ was evaluated in 635-type alkaline button cells. Generally, button cells were assembled in the following manner. Dried $Li_xNiO_2$ powder was blended together manually with an oxidation resistant graphite (e.g., Timrex SFG-15 from Timcal) and a KOH electrolyte solution containing 35.3 wt % KOH and 2 wt % zinc oxide in a weight ratio of 75:20:5 using a mortar and pestle to form a wet cathode mix. About 0.45 g of the wet cathode mix was pressed into a nickel grid welded to the bottom of the cathode can of the cell. A disk of porous separator material including a layer of cellophane bonded to a non-woven polymeric layer (e.g., "Duralam" or PDM "PA25") and saturated with electrolyte solution was positioned on top of the cathode. Additional KOH electrolyte solution was added to the separator to ensure that electrolyte solution fully penetrated the separator and wet the underlying cathode. A polymeric insulating seal was placed on the edge of the anode can. About 2.6 g of anode slurry containing zinc alloy particles, electrolyte solution, and a gelling agent was added to the anode can. Next, the anode can with the polymeric seal was positioned on top of the cathode can and the two cans mechanically crimped together to hermetically seal the cell.

Figure 10:
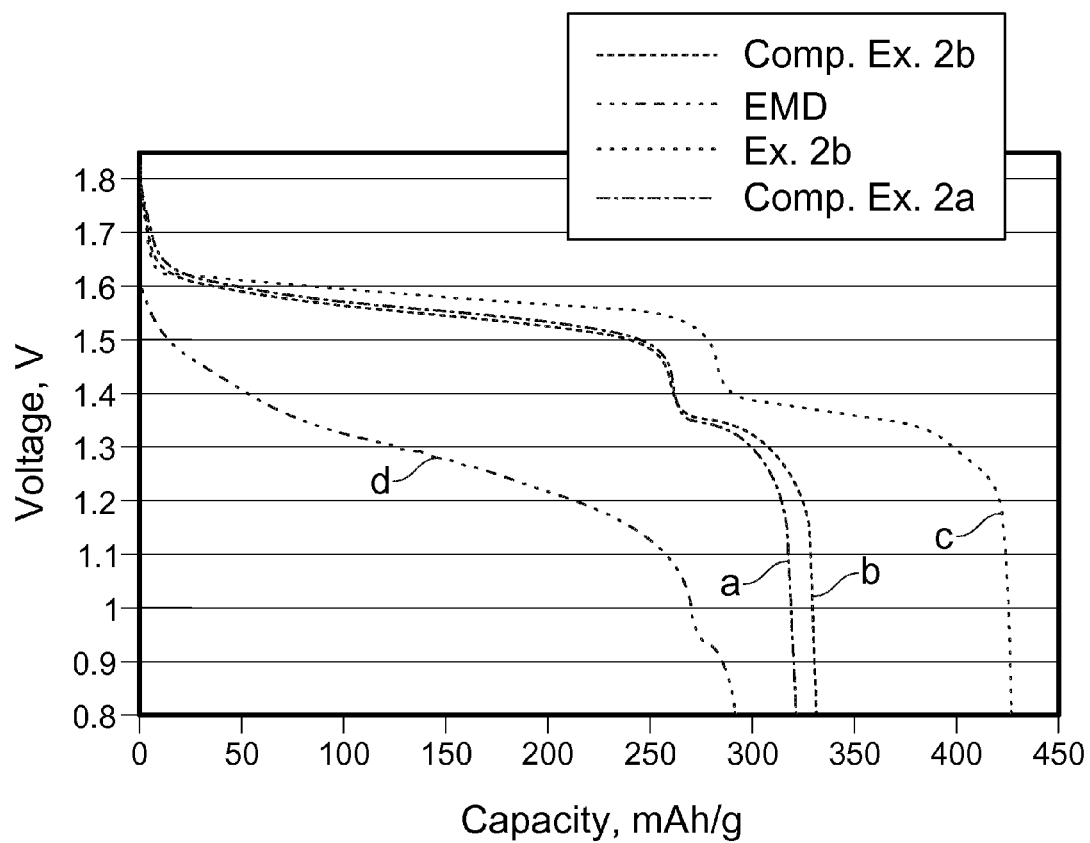
FIG. 10 is a plot depicting a comparison of discharge curves for alkaline button cells with cathodes including: (a) delithiated cobalt and aluminum-doped nickel (IV) oxide, (a) $Li_xNi_{0.80}Co_{0.15}Al_{0.05}O_2$; (b) delithiated cobalt, aluminum, and boron-doped nickel(IV) oxide, $Li_xNi_{0.791}Co_{0.149}Al_{0.049}B_{0.01}O_2$; (c.) delithiated undoped nickel (IV) oxide, $Li_xNiO_2$; and (d.) electrolytic manganese dioxide (EMD), all discharged at a nominal low rate (i.e., 9.5 mA/g) to a 0.8 V cutoff voltage.

Generally, cells were tested within 24 hours after closure. OCV values were measured immediately before discharge and are listed in Table 3, infra. Cells were discharged continuously at relatively low and high rates of 7.5 mA/g and 60 mA/g, respectively to a cutoff voltage of 0.8 V. Gravimetric specific capacities (i.e., mAh/g) for cells discharged at low and high rates are given in Table 3, infra. The capacity of the cells of Example 2b containing delithiated $Li_{0.06}NiO_2$ prepared from the $LiNiO_2$ of Example 1 and discharged to a 0.8 V cutoff at a 10 mA/g constant current is about 150% of that of the cells of Comparative Example 1 containing EMD (e.g., Tronox AB) as the only cathode active material. Further, the discharge voltage profile has two relatively flat plateaus with average voltage values of about 1.55 V and 1.35 V. A representative discharge curve for cells of Example 2b is shown in FIG. 10.

Example 3

Figure 2:
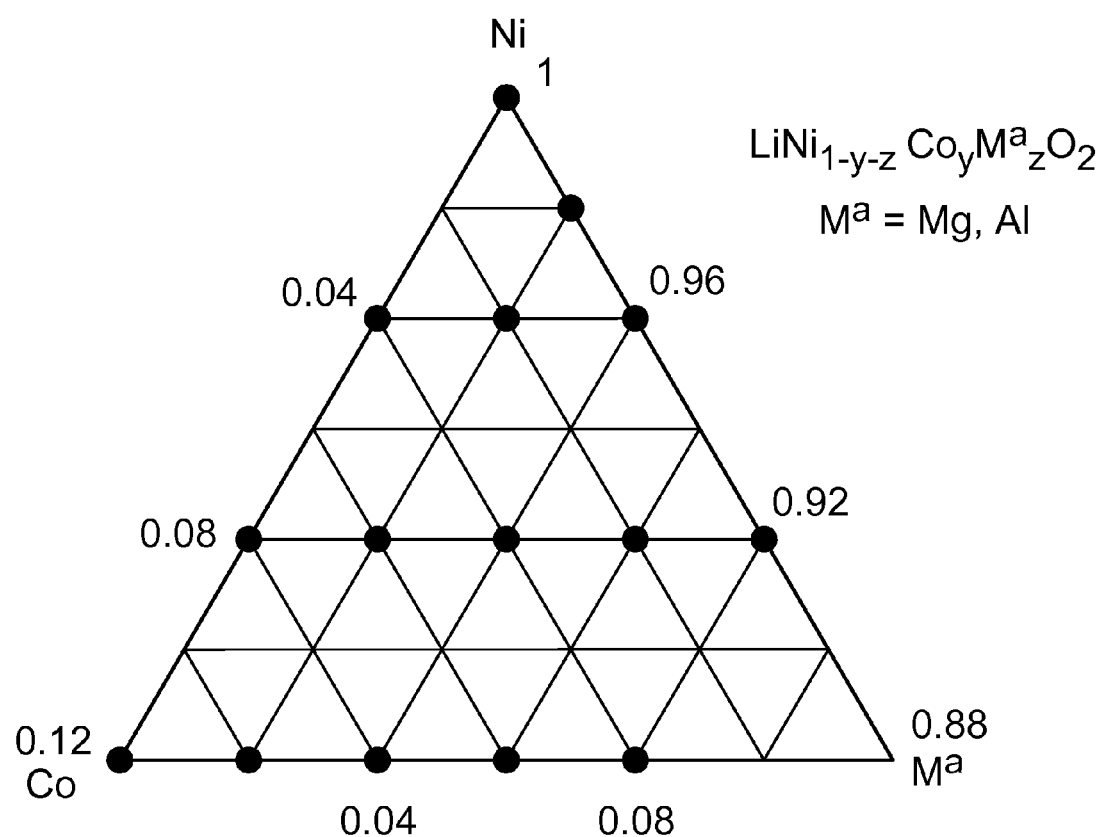
FIG. 2 is a plot depicting the Ni-rich portion of the ternary composition diagram for Li—Ni—Co—Mg and Li—Ni—Co—Al oxide systems, indicating the compositions of 26 metal-doped lithium nickel oxides, which are precursors to the corresponding delithiated metal-doped nickel(IV) oxides.

Synthesis of Metal-Substituted Lithium Nickel Oxide, $LiNi_{1-y-z}Co_yM_zO_2$ Metal-substituted $Li(Ni_{1-y-z}Co_yAl_z)O_2$ and $Li(Ni_{1-y-z}Co_yMg_z)O_2$ systems shown in the ternary composition diagram in FIG. 2 were synthesized, delithiated, and evaluated for performance of the corresponding delithiated (i.e., lithium deficient) metal-doped nickel oxide active materials with regard to oxygen gas evolution, initial open circuit voltage (OCV), fresh (i.e., 24 hours) discharge capacity, and capacity retention after storage at ambient and elevated temperatures.

Metal-substituted lithium nickel oxides, $LiNi_{1-y-z}Co_yM_zO_2$ (M=Mg, Al) were synthesized by blending 10.00 g of spherical β-nickel oxyhydroxide powder prepared by oxidation of a commercial spherical β-nickel hydroxide powder (e.g., Changsha Research Institute of Mining & Metallurgy, Changsha, P. R. C; Kansai Catalyst Co., Ltd., Osaka, Japan) by the method of Comparative Example 2 (infra) with stoichiometric amounts of a cobalt oxide (Co$_3$O$_4$, Aldrich, 99.8%) and either magnesium oxide (MgO, Aldrich, >99%) or aluminum metal powder (Al, Acros, 99%) and lithium hydroxide monohydrate (LiOH.H$_2$O, Aldrich, >99%) to obtain the target atom ratios required for the desired compositions. The target Example 3 compositions have the following Li:Ni:Co:M metal atom ratios: Example 3a 1:0.96:0.04:0; 3b 1:0.92:0.08:0; 3c 1:0.88:0.12:0; 3c-1(M=Mg), 3d-2 (M=Al) 1:0.98:0:0.2; 3e-1(M=Mg), 3e-2(M=Al) 1:0.96:0:0.04; 3f-1(M=Mg), 3f-2(M=Al) 1:0.92:0:0.08; 3g-1

(M=Mg), 3g-2(M=Al) 1:0.96:0.02:0.02; 3h-1(M=Mg), 3h-2 (M=Al) 1:0.92:0.06:0.02; 3i-1(M=Mg), 3i-2(M=Al) 1:0.92: 0.04:0.04; 3j-1(M=Mg), 3j-2(M=Al) 1:0.92:0.02:0.06; 3k-1 (M=Mg), 3k-2(M=Al) 1:0.88:0.10:0.02; 3l-1(M=Mg), 3l-2 (M=Al) 1:0.88:0.08:0.04; 3m-1(M=Mg), 3m-2(M=Al) 1:0.88:0.06:0.06; 3n-1(M=Mg), 3n-2(M=Al) 1:0.88:0.04:0.08. All the mixtures were simultaneously mixed by high-energy milling and heated to 210° C. at a ramp rate of 0.5° C./min, held for 16-20 hours at temperature in an $O_2$ flow, and allowed to furnace cool. The mixtures were simultaneously re-milled and re-heated under $O_2$ first to 105° C. (2.5° C./min) for 30 min, next to 350° C. (4° C./min) for 3 hours, and finally to 800° C. (4° C./min) and held for 48 hours and then allowed to furnace cool to ambient room temperature.

Figure 3:
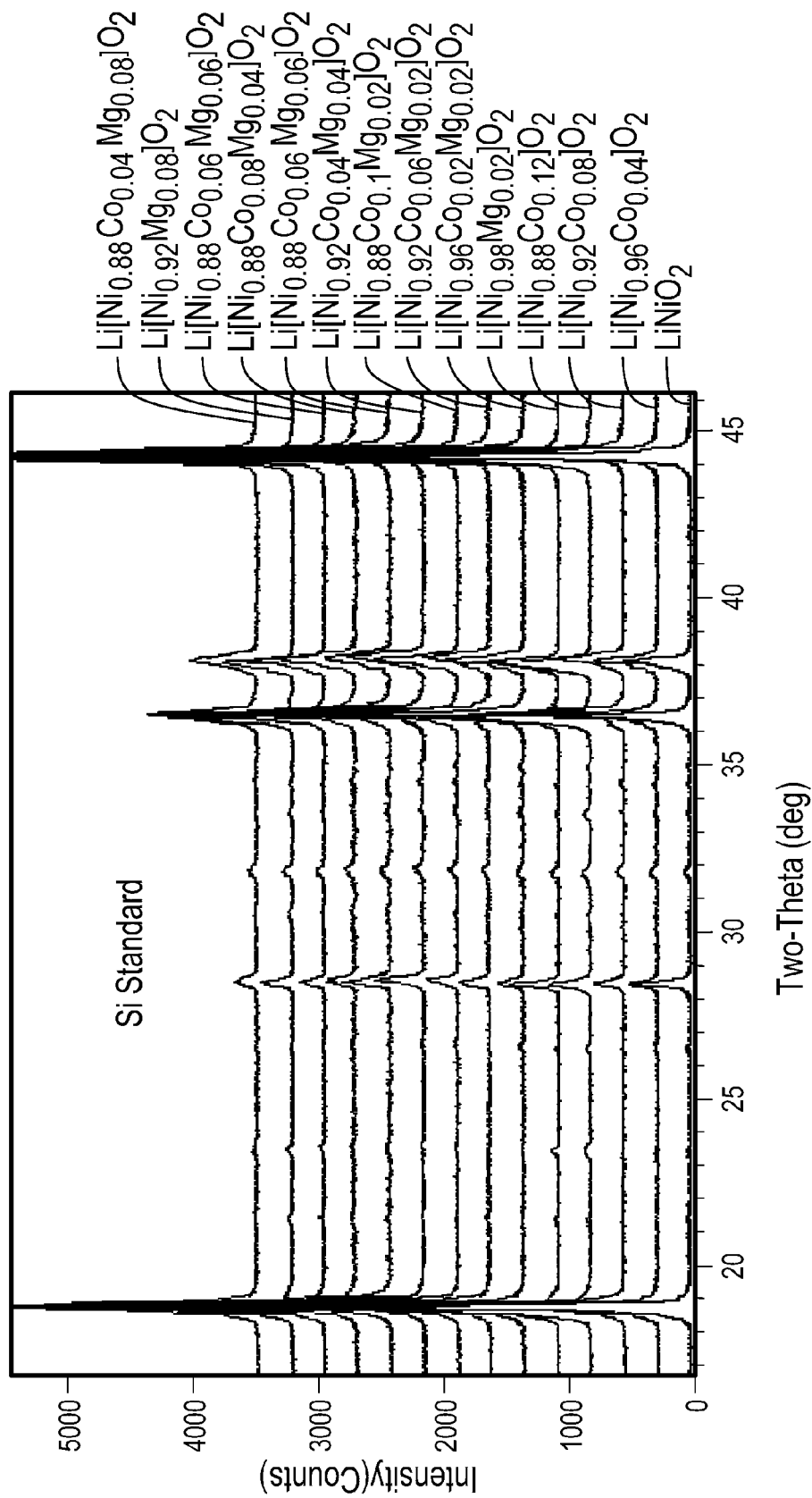
FIG. 3 is a plot depicting an overlay of the x-ray powder diffraction patterns for cobalt, and cobalt and magnesium-doped lithium nickel oxide compositions, and undoped lithium nickel oxide, measured using Cu Kα radiation and scanned between 17 and 46 degrees 2θ.
Figure 4:
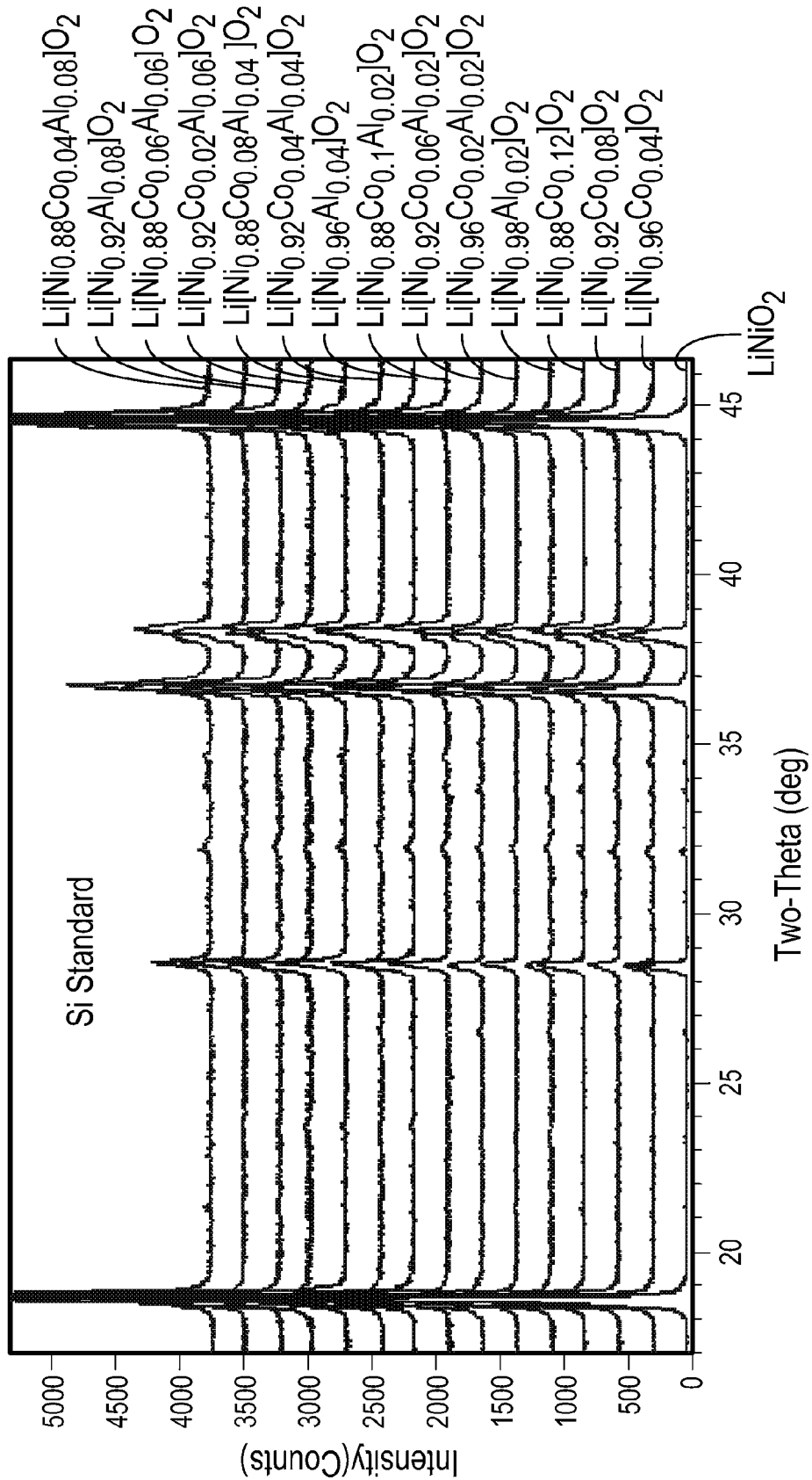
FIG. 4 is a plot depicting an overlay of the x-ray powder diffraction patterns for cobalt, and cobalt and aluminum-doped lithium nickel oxide compositions, and undoped lithium nickel oxide, measured using Cu Kα radiation and scanned between 17 and 46 degrees 2θ.

The products were re-milled and the overlaid x-ray powder diffraction patterns are shown in FIGS. 3 and 4. The measured diffraction patterns for the 26 metal-substituted lithium nickel oxides were consistent with that of a layered $\alpha$-$FeO_2$-type structure and comparable to that reported for a stoichiometric $LiNiO_2$ (ICDD, PDF#09-0063).

Elemental analyses of selected compositions of delithiated metal-substituted nickel oxide of Examples 2 and 3 (after acid treatment) are summarized in Table 1. Samples of metal-substituted lithium nickel oxides were acid-treated for two different periods of time (e.g., 20 and 40 hours) to determine the relationship between treatment time and the extent of delithiation (i.e., lithium extraction). All of the samples were treated simultaneously for the same length of time and under the same temperature and mixing conditions to minimize variability. In general, most of the lithium ions appeared to be removed during the first 20 hours of acid-treatment, nearly independent of the composition. However, removal of any portion of the remaining lithium during an additional 20 hours of acid treatment significantly increased the total discharge capacity. Additional acid treatment of selected samples of metal-substituted lithium nickel oxide for up to 60 hours total did not substantially decrease the amount of residual Li nor increase discharge capacity in button cells. Residual Li levels corresponded to an atom ratio of about 0.1 or less (i.e., <1 wt %) for acid treatment times of 40 hours or greater. In contrast, the amount of residual Li level after 20 hours of acid treatment was generally greater than three times that for 40 hours (e.g., >2 wt %).

TABLE 1

Elemental analyses for a selection of layered metal-substituted lithium nickel oxide sand the corresponding delithiated Ni (IV) oxides and a $Ni(OH)_2$ precursor.

| Ex. No. | Nominal Composition of Precursor | Delith. Time (h) | Li | Ni | Co | Mg | Al |
|---|---|---|---|---|---|---|---|
| 2a | $LiNiO_2$ | 20 | 0.31 | 1.04 | — | — | — |
| 2b | $LiNiO_2$ | 40 | 0.06 | 1.09 | — | — | — |
| — | $LiNi_{0.96}Mg_{0.04}O_2$ | 20 | 0.19 | 1.02 | — | 0.04 | — |
| 3e-1 | $LiNi_{0.96}Mg_{0.04}O_2$ | 40 | 0.06 | 1.02 | — | 0.04 | — |
| — | $LiNi_{0.96}Al_{0.04}O_2$ | 20 | 0.30 | 1.01 | — | — | 0.02 |
| 3e-2 | $LiNi_{0.96}Al_{0.04}O_2$ | 40 | 0.07 | 1.03 | — | — | 0.03 |
| — | $LiNi_{0.96}Co_{0.02}Mg_{0.02}O_2$ | 20 | 0.20 | 1.07 | 0.05 | 0.02 | — |
| — | $LiNi_{0.92}Co_{0.04}Mg_{0.04}O_2$ | 20 | 0.31 | 1.00 | 0.08 | 0.04 | — |
| 3i-1 | $LiNi_{0.92}Co_{0.04}Mg_{0.04}O_2$ | 40 | 0.07 | 1.01 | 0.10 | 0.04 | — |
| — | $LiNi_{0.92}Co_{0.04}Al_{0.04}O_2$ | 20 | 0.13 | 0.99 | 0.08 | — | 0.04 |
| — | $LiNi_{0.92}Co_{0.08}O_2$ | 20 | 0.33 | 0.96 | 0.12 | — | — |
| 3b | $LiNi_{0.92}Co_{0.08}O_2$ | 40 | 0.12 | 1.00 | 0.13 | — | — |
| 3m-1 | $LiNi_{0.88}Co_{0.06}Mg_{0.06}O_2$ | 40 | 0.08 | 1.02 | 0.07 | 0.10 | — |
| 3k-1 | $LiNi_{0.88}Co_{0.10}Mg_{0.02}O_2$ | 40 | 0.01 | 0.96 | 0.14 | 0.02 | — |
| — | $Ni(OH)_2$ | — | — | 0.98 | 0.02 | — | — |

Figure 5:
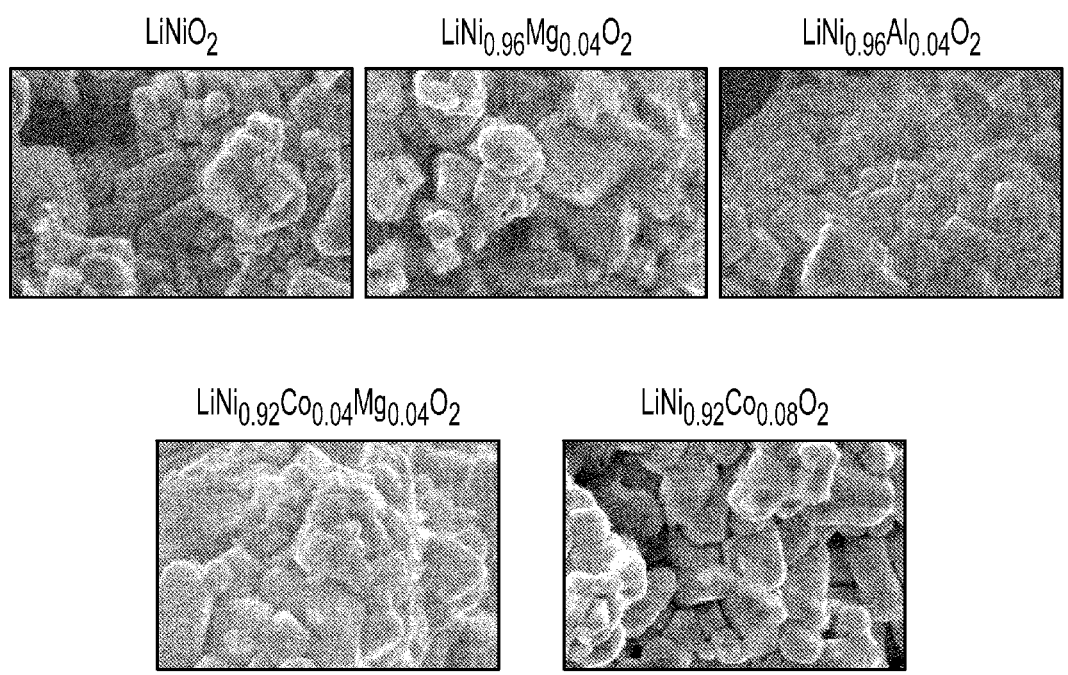
FIG. 5 includes SEM images showing representative morphologies and crystallite sizes for selected metal-doped lithium nickel oxide powders: (a) undoped lithium nickel oxide, $LiNiO_2$; (b) magnesium-doped lithium nickel oxide, $LiNi_{0.96}Mg_{0.04}O_2$; (c) aluminum-doped lithium nickel oxide, $LiNi_{0.96}Al_{0.04}O_2$; (d) cobalt and magnesium-doped lithium nickel oxide, $Li(Ni_{0.92}Co_{0.04}Mg_{0.04})O_2$; and (e) cobalt-doped lithium nickel oxide, $LiNi_{0.92}Co_{0.08}O_2$. Magnification for all cases is 10,000×.

Samples were measured using inductively coupled plasma atomic emission spectroscopy ("ICP-AE") by a commercial analytical laboratory (e.g., Galbraith Laboratories, Inc., Knoxyille, Tenn.). Average particle sizes for the metal-substituted lithium nickel oxides can be estimated from analysis of SEM micrographs. All of the synthesized compositions exhibited strongly faceted crystallites ranging in size from about 1 to 4 microns as shown for several selected samples in FIG. 5. All the metal-substituted lithium nickel oxide samples showed evidence for some inter-crystallite sintering resulting in the formation of larger aggregates composed of lightly sintered crystallites prior to delithiation. Specific surface areas (BET) of these aggregates were relatively low, generally less than about 1 $m^2$/g.

Example 4

Synthesis of Delithiated Metal-Doped Nickel Oxide, $Li_xNi_{1-y-z}Co_yM^a_zO_2$

A 10.0 g portion of each of the metal-doped lithium nickel oxides $LiNi_{1-y-z}Co_yM^a_zO_2$ (M=Mg, Al) of Examples 3a-n was simultaneously stirred in separate 150 ml aliquots of 6M $H_2SO_4$ solution held at about 0° C. (e.g., 2-5° C.) for 20 hours and another portion of each for 40 hours. The delithiated solids were collected by filtration, washed with deionized water until washings had nominally neutral pH, and dried at 80° C. in air. The delithiated powders of Examples 4a-n have the following nominal Ni:Co:M metal atom ratios: Example 4a 0.96:0.04:0; 4b 0.92:0.08:0; 4c 0.88:0.12:0; 4d-1(M=Mg), 4d-2(M=Al) 0.98:0:0.2; 4e-1(M=Mg), 4e-2(M=Al) 0.96:0: 0.04; 4f-1(M=Mg), 4f-2(M=Al) 0.92:0:0.08; 4g-1(M=Mg), 4g-2(M=Al) 0.96:0.02:0.02; 4h-1(M=Mg), 4h-2(M=Al) 0.92:0.06:0.02; 4i-1(M=Mg), 4i-2(M=Al) 0.92:0.04:0.04; 4j-1(M=Mg), 4j-2(M=Al) 0.92:0.02:0.06; 4k-1(M=Mg), 4k-2(M=Al) 0.88:0.10:0.02; 4l-1(M=Mg), 4l-2(M=Al) 0.88:

0.08:0.04; 4m-1(M=Mg), 4m-2(M=Al) 0.88:0.06:0.06; 4n-1 (M=Mg), 4n-2(M=Al) 0.88:0.04:0.08. X-ray powder diffraction patterns of the dried solids were measured using Cu Kα radiation. Thermal stabilities of selected samples of delithiated powders of Example 4a-n were determined by DSC. The amount of residual lithium was determined for selected samples of delithiated powders of Example 4a-n by ICP-EA and is shown in Table 1.

To assess the relative effectiveness of partial substitution of Ni by various metal ions on decreasing the extent of electrolyte oxidation by the delithiated metal-doped nickel (IV) oxides, the amount of evolved oxygen gas was measured as a function of time. Mixtures containing 60.6 wt % delithiated metal-doped nickel(IV) oxide, 3 wt % graphite, and 36.4 wt % alkaline electrolyte solution were placed inside laminated foil bags and heat-sealed closed. The bags were placed in an oven and held at various temperatures, for example, 25, 45 or 60° C. for pre-determined periods of time. The total amount of oxygen gas evolved per gram of delithiated nickel (IV) oxide was determined by measuring the relative buoyancy of the foil bag containing the trapped gas using Archimede's principle after storage for 0.5, 3.5, 7, 14, and 21 days. Several samples of delithiated metal-doped nickel (IV) oxides having representative compositions were evaluated. All samples evolved oxygen gas at 25° C.

Other materials having known gassing properties can be used as controls. For example, a sample of delithiated undoped nickel(IV) oxide evolved the largest amount of gas in the shortest period of time. After 3.5 days at 25° C., more than 7 cm$^3$ of oxygen gas per gram was evolved. In the same period of time at the same temperature, less than 0.5 cm$^3$ of oxygen was evolved per gram of a commercial EMD. Further, during the same period of time (i.e., 3.5 days), a delithiated cobalt-doped nickel(IV) oxide having a nominal composition of $Li_{0.12}Ni_{0.92}Co_{0.08}O_2$ evolved the least amount of gas, about 40% of that evolved by the delithiated undoped nickel (IV) oxide. In fact, the total amount of oxygen gas evolved after 21 days at 25° C. was less than 4.25 cm$^3$/gram for the delithiated cobalt-doped nickel (IV) oxide or less than 50% of that evolved by the delithiated undoped nickel (IV) oxide. A delithiated magnesium-doped nickel (IV) oxide having the nominal composition $Li_{0.06}Ni_{0.96}Mg_{0.04}O_2$ evolved less than 6 cm$^3$/gram after 21 days. A delithiated cobalt and magnesium-doped nickel (IV) oxide having the nominal composition $Li_{0.07}Ni_{0.92}Co_{0.04}Mg_{0.04}O_2$ evolved about 10% more total oxygen than the magnesium-only doped nickel (IV) oxide. The rate of gas evolution with time also decreased rapidly for those compositions having the lowest amounts of total evolved oxygen. It is believed that surface passivation could be responsible for the rapid cessation of oxygen evolution. Oxygen gas evolution test results for selected compositions are summarized in Table 2.

Figure 6:
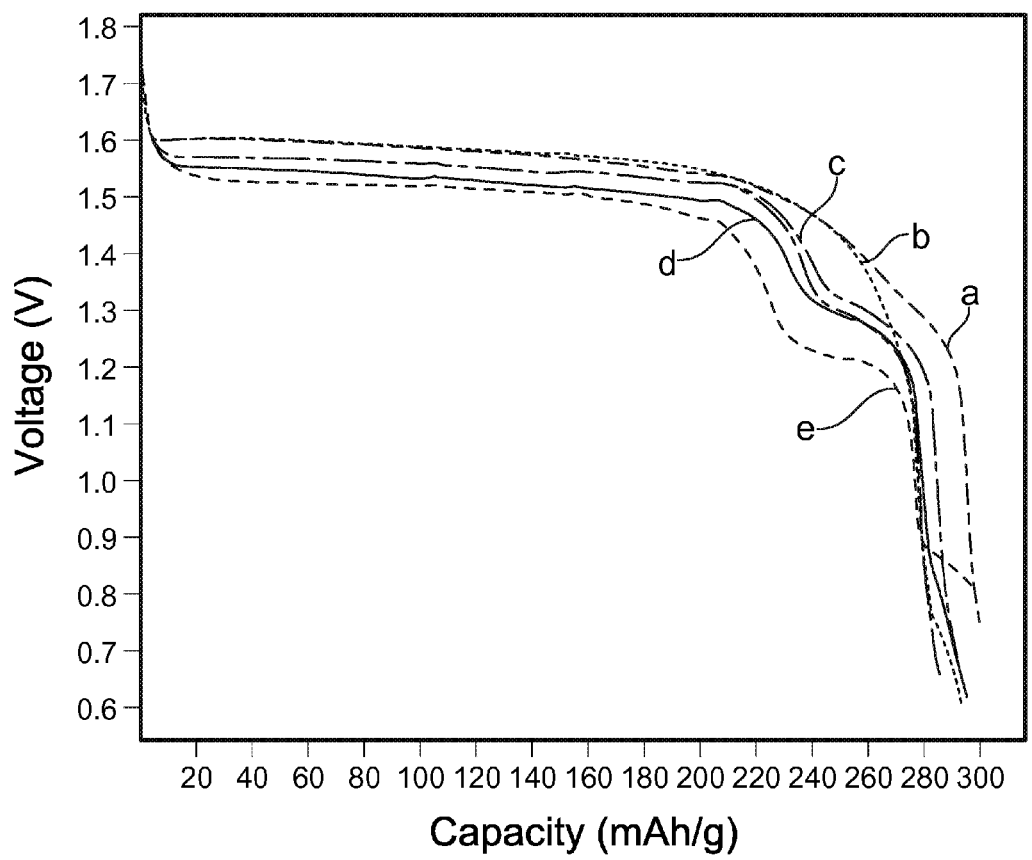
FIG. 6 is a plot depicting an overlay of the voltage profile curves for alkaline button cells with cathodes including delithiated metal-doped nickel (IV) oxides: fa) $Li_xNi_{0.88}Co_{0.04}Mg_{0.08}O_2$; (b) $Li_xNi_{0.88}Co_{0.06}Mg_{0.06}O_2$; (c) $Li_xNi_{0.88}Co_{0.08}Mg_{0.04}O_2$; (d) $Li_xNi_{0.88}Co_{0.01}Mg_{0.02}O_2$; (e) $Li_xNi_{0.88}Co_{0.12}O_2$, discharged at a nominal low rate (i.e., 7.5 mA/g) to a 0.8 V cutoff voltage.
Figure 7:
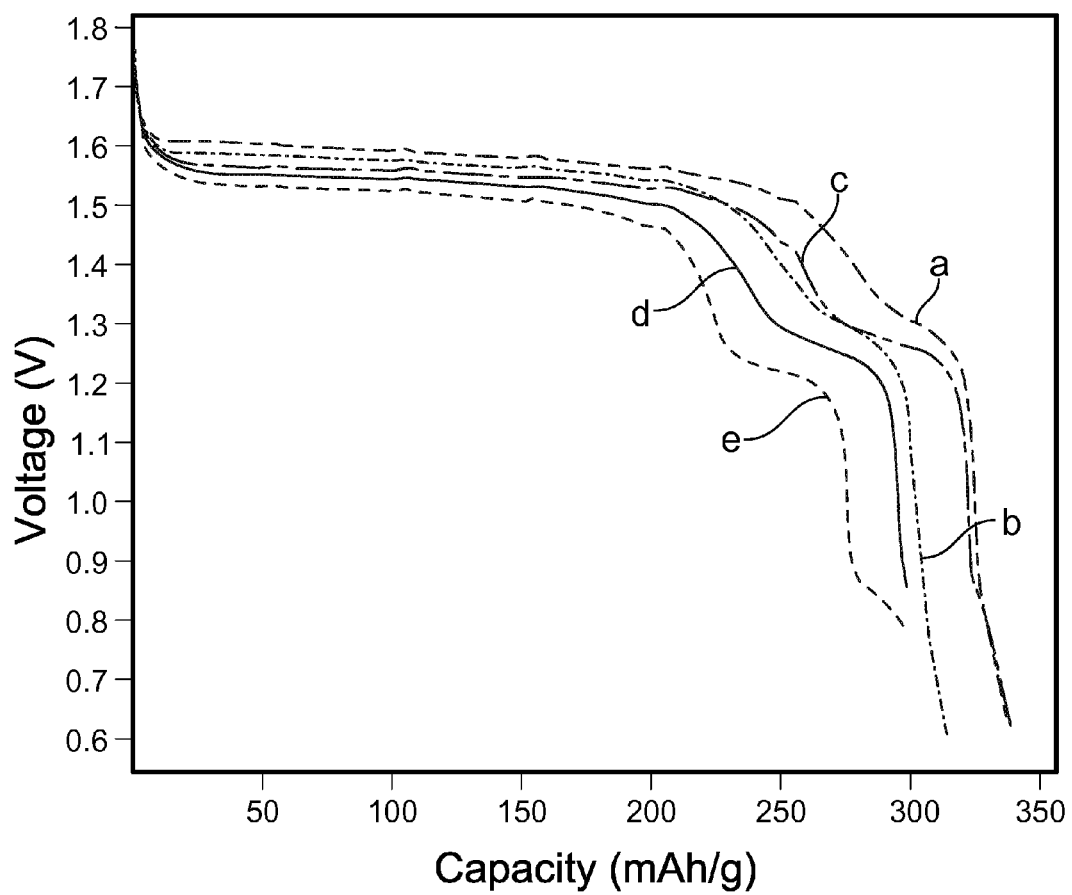
FIG. 7 is a plot depicting an overlay of the voltage profile curves for alkaline button cells with cathodes including delithiated metal-doped nickel (IV) oxides: (a) $Li_xNi_{0.88}Co_{0.04}Al_{0.08}O_2$; (b) $Li_xNi_{0.88}Co_{0.06}Al_{0.06}O_2$; (c) $Li_xNi_{0.88}Co_{0.08}Al_{0.04}O_2$; and (d) $Li_xNi_{0.88}Co_{0.10}Al_{0.02}O_2$; and (e) $Li_xNi_{0.88}Co_{0.12}O_2$ discharged at a nominal low rate (i.e., 7.5 mA/g) to a 0.8 V cutoff voltage.

Discharge performance of delithiated metal-doped nickel (IV)-containing oxides acid treated for at least 40 hours was evaluated in 635-type alkaline button cells. Formulation of the cathode mix included blending the delithiated metal-doped nickel (IV) oxide with an oxidation resistant graphite (e.g., Timrex SFG-15 from Timcal), and alkaline electrolyte (9N KOH) in a 75:20:5 mass ratio. The total weight of cathode mix in each cell was about 0.45 g. The anode contained a large excess of Zn slurry (e.g., about 2.6 g/cell). OCV values measured immediately after cell closure generally ranged from about 1.84 to 1.92 V. Cells were held for at least about 24 hours at ambient temperature (i.e., "fresh") to ensure thorough absorption of electrolyte by separator and cathode. OCV values measured immediately before the start of discharge typically ranged from about 1.72 to 1.81 V. Generally, fresh OCV values appeared to be independent of dopant type and level except for those compositions having high levels of Mg only. Cells were discharged both at a relative low rate (e.g., about 7.5 mA/g of active material) as well as a relative high rate (e.g., about 60 mA/g of active material) to a 0.8 V cutoff voltage. Overlays of representative low-rate discharge curves for button cells with cathodes including selected compositions of delithiated metal-doped nickel(IV) oxides having a constant total dopant concentration are shown in FIGS. 6 and 7. The low-rate discharge curves characteristically have a single, relatively flat voltage plateau ranging between about 1.5 and 1.6 V. Average discharge voltage (i.e., CCV at 50% depth of discharge, viz. "50% DOD") decreased monotonically with increasing cobalt level (i.e., in absence of Mg or Al). Highest values of average discharge voltage were obtained for compositions containing Mg or Al and little or no Co. Post-storage capacity retention was determined for button cells discharged at low rate after holding for 1 week at 25° C. and 45° C. Average discharge capacities, OCV, and average discharge voltage for all 26 synthesized compositions of delithiated metal-doped nickel (IV) oxides are summarized in Table 3.

TABLE 2

Oxygen gas evolution at 25° C. by delithiated metal-doped Ni (IV) oxides

| Ex. No. | Nominal Compositions | Vol. gas evolved/g matl @ 25° C. (cm$^3$) | | | | |
|---|---|---|---|---|---|---|
| | | 0.5 days | 3.5 days | 7 days | 14 days | 21 days |
| 2b | $Li_{0.06}NiO_2$ | 5.8 | 7.2 | 7.6 | 8.4 | 8.6 |
| 4e-1 | $Li_{0.06}Ni_{0.96}Mg_{0.04}O_2$ | 2.9 | 4.4 | 5.7 | 5.8 | 5.9 |
| 4e-2 | $Li_{0.07}Ni_{0.96}Al_{0.04}O_2$ | 5.3 | 6.5 | 7.2 | 7.5 | 8.2 |
| 4i-1 | $Li_{0.07}Ni_{0.92}Co_{0.04}Mg_{0.04}O_2$ | 4.1 | 5.3 | 5.9 | 6.2 | 6.5 |
| 4b | $Li_{0.12}Ni_{0.92}Co_{0.08}O_2$ | 3.1 | 3.2 | 4.1 | 4.2 | 4.4 |
| C-2 | $Li_xNi_{0.8}Co_{0.15}Al_{0.05}O_2$ | — | — | 2.8 | — | — |

TABLE 3

Discharge capacities for alkaline button cells with cathodes containing selected delithiated cobalt/magnesium/aluminum-doped nickel (IV) oxides.

| Ex. No. | Nominal Compositions | OCV 24 h, 25° C. | CCV 7.5 mA/g 50% DOD | Low rate capacity (7.5 mA/g) 24 h, 25° C. | 1 wk, 25° C. | 1 wk, 45° C. | High rate capacity (60 mA/g) 24 h, 25° C. |
|---|---|---|---|---|---|---|---|
| 2b | $NiO_2$ | 1.84 | 1.57 | 334 | 317 | 277 | 381 |
| 4a | $Ni_{0.96}Co_{0.04}O_2$ | 1.78 | 1.53 | 364 | | 321 | 379 |
| 4b | $Ni_{0.92}Co_{0.08}O_2$ | 1.77 | 1.51 | 358 | 333 | 315 | 372 |
| 4c | $Ni_{0.88}Co_{0.12}O_2$ | 1.79 | 1.50 | 337 | | 302 | 320 |
| 4d-1 | $Ni_{0.98}Mg_{0.02}O_2$ | 1.81 | 1.56 | 359 | | 322 | 363 |
| 4e-1 | $Ni_{0.96}Mg_{0.04}O_2$ | 1.70 | 1.57 | 365 | 347 | 307 | 387 |
| 4f-1 | $Ni_{0.92}Mg_{0.08}O_2$ | 1.61 | 1.49 | 190 | | 228 | — |
| 4g-1 | $Ni_{0.96}Co_{0.02}Mg_{0.02}O_2$ | 1.79 | 1.56 | 322 | | 287 | 345 |
| 4h-1 | $Ni_{0.92}Co_{0.06}Mg_{0.02}O_2$ | 1.76 | 1.54 | 368 | | 318 | 287 |
| 4i-1 | $Ni_{0.92}Co_{0.04}Mg_{0.04}O_2$ | 1.71 | 1.55 | 373 | 362 | — | 387 |
| 4j-1 | $Ni_{0.92}Co_{0.02}Mg_{0.06}O_2$ | 1.72 | 1.57 | 369 | | — | 350 |
| 4k-1 | $Ni_{0.88}Co_{0.10}Mg_{0.02}O_2$ | 1.81 | 1.52 | 303 | | 265 | 370 |
| 4l-1 | $Ni_{0.88}Co_{0.08}Mg_{0.04}O_2$ | 1.77 | 1.55 | 316 | | 283 | 332 |
| 4m-1 | $Ni_{0.88}Co_{0.06}Mg_{0.06}O_2$ | 1.78 | 1.58 | 347 | | 318 | 368 |
| 4n-1 | $Ni_{0.88}Co_{0.04}Mg_{0.08}O_2$ | — | — | — | | 293 | — |
| 4d-2 | $Ni_{0.98}Al_{0.02}O_2$ | 1.80 | 1.59 | 352 | | 295 | 373 |
| 4e-2 | $Ni_{0.96}Al_{0.04}O_2$ | 1.78 | 1.59 | 363 | 236 | 323 | 374 |
| 4f-2 | $Ni_{0.92}Al_{0.08}O_2$ | 1.80 | 1.57 | 286 | | 242 | 383 |
| 4g-2 | $Ni_{0.96}Co_{0.02}Al_{0.02}O_2$ | 1.76 | 1.56 | 359 | | 302 | 373 |
| 4h-2 | $Ni_{0.92}Co_{0.06}Al_{0.02}O_2$ | 1.76 | 1.53 | 342 | | 301 | 328 |
| 4i-2 | $Ni_{0.92}Co_{0.04}Al_{0.04}O_2$ | 1.81 | 1.56 | 340 | | 294 | 340 |
| 4j-2 | $Ni_{0.92}Co_{0.02}Al_{0.06}O_2$ | 1.75 | 1.57 | 351 | | 292 | 383 |
| 4k-2 | $Ni_{0.88}Co_{0.10}Al_{0.02}O_2$ | 1.78 | 1.52 | 338 | | 302 | 355 |
| 4l-2 | $Ni_{0.88}Co_{0.08}Al_{0.04}O_2$ | 1.79 | 1.54 | 360 | | 318 | 374 |
| 4m-2 | $Ni_{0.88}Co_{0.06}Al_{0.06}O_2$ | 1.78 | 1.55 | 340 | | 266 | 333 |
| 4n-2 | $Ni_{0.88}Co_{0.04}Al_{0.08}O_2$ | 1.72 | 1.57 | 360 | | 316 | 338 |
| C-3a | $Ni_{0.9}Co_{0.1}O_2$ | — | — | 355 | | — | — |
| C-3b | $Ni_{0.8}Co_{0.2}O_2$ | 1.81 | 1.50 | 335 | | — | — |
| C-2a | $Ni_{0.8}Co_{0.15}Al_{0.05}O_2$ | 1.85 | 1.55 | 325 | | — | — |
| C-2b | $Ni_{0.791}Co_{0.149}Al_{0.049}B_{0.01}O_2$ | 1.83 | 1.55 | 335 | | — | — |

Figure 8:
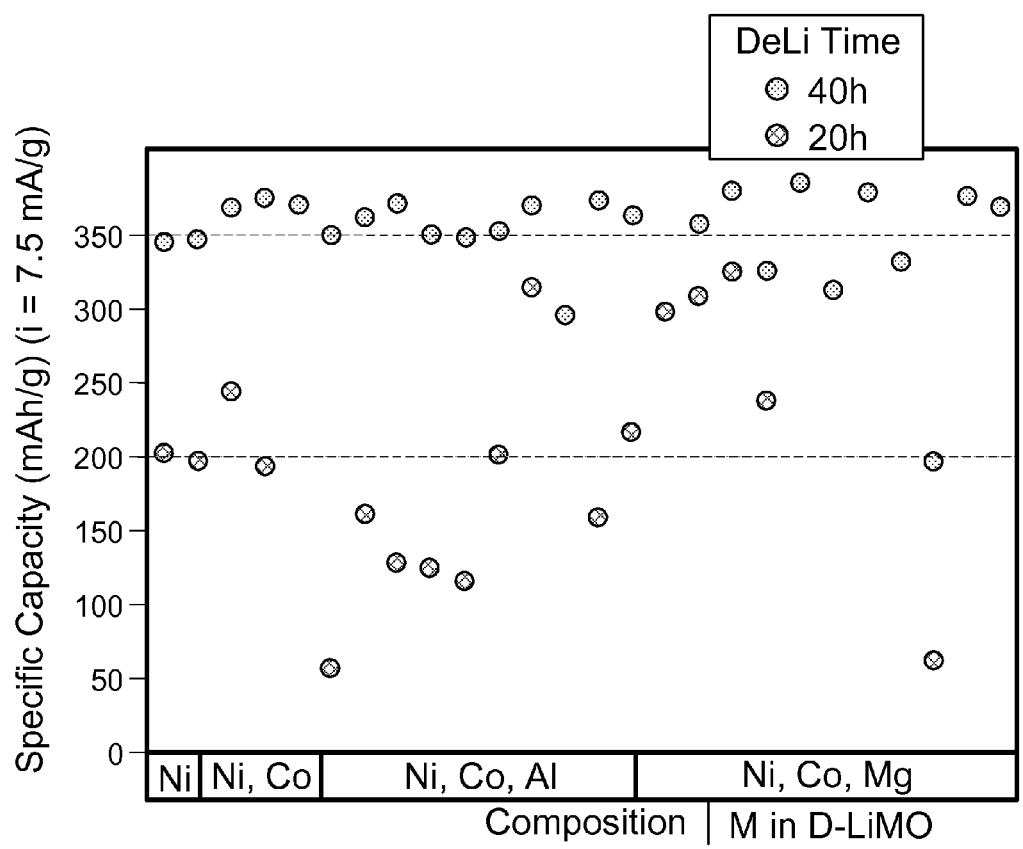
FIG. 8 is a plot depicting a comparison of discharge capacities for alkaline button cells containing undoped delithiated nickel (IV) oxide and the delithiated metal-doped nickel(IV) oxides that were acid-treated for either 40 hours or 20 hours and discharged at a nominal low-rate (i.e., 7.5 mA/g) to a 0.8 V cutoff voltage.

Button cells having the greatest low-rate (i.e., 7.5 mA/g) fresh specific capacities generally contained delithiated metal-doped nickel (IV) oxides having nickel partially substituted by a combination of cobalt and magnesium and a total substitution level of less than about 10 atom %. The average discharge capacity values generally ranged from about 365 to 375 mAh/g and corresponded to about 110-112% of that for cells containing delithiated undoped nickel oxide. Similarly, cells containing delithiated singly-doped nickel (IV) oxides in which the nickel ions were partially substituted by only cobalt, magnesium or aluminum ions at a level of less than about 5 atom % had specific capacities that were up to about 108-109% of that for cells with delithiated, undoped nickel (IV) oxide. Most of the cells containing either delithiated singly or multiply-doped nickel(IV) oxides had low-rate discharge capacities that were either comparable to or slightly greater (e.g., 5% greater) than control cells containing a delithiated undoped nickel(IV) oxide. Further, cells containing delithiated metal-doped nickel(IV) oxides that had been acid-treated for 40 hours or greater consistently had >80% higher capacities than cells containing delithiated metal-doped nickel(IV) oxides acid-treated for only 20 hours as shown in FIG. 8.

Button cells containing delithiated metal-doped nickel(IV) oxides discharged at a relative high-rate (e.g., 60 mA/g, 100 mA/g) had specific capacities that generally were comparable to or even slightly greater than that of cells containing delithiated doped nickel(IV) oxide. Surprisingly, the high-rate capacities for nearly all the cells containing delithiated metal-doped nickel(IV) oxides were comparable to (i.e., 95-101% of the low-rate capacity) or even slightly greater (i.e., 104-114% of the low-rate capacity) than the corresponding low-rate capacities. For several compositions having relatively high metal dopant levels of either Mg or Al (e.g., $Ni_{0.92}M_{0.08}O_2$, M=Mg, Al), the high-rate discharge capacities were substantially greater than the corresponding low-rate capacities. This is consistent with a relatively low level of cell polarization and excellent high-rate performance for cells containing delithiated metal-doped nickel (IV) oxides.

Post-storage capacity retention was determined for button cells containing delithiated metal-doped nickel (IV) oxides discharged at low-rate after holding for 1 week at 25° C. and 45° C. Average discharge capacities after storage at 25 and 45° C. as well as the corresponding calculated percent capacity retentions are summarized in Table 4. Capacities of cells containing delithiated metal-doped nickel(IV) oxides stored at 25° C. for 1 week and then discharged at low rate to a 0.8 V cutoff generally ranged from about 85 to 95% of the corresponding fresh capacities (i.e., held for 24 hours at 25° C. before discharge). Capacity retention of cells stored at 45° C. for 1 week ranged from about 80% to 90% of the fresh capacities for nearly all the delithiated metal-doped nickel (IV) oxides. Capacity retention for cells containing delithiated undoped nickel (IV) oxide was up to 83%. The highest capacity retention (>90%) after storage at 45° C. was obtained for cells containing delithiated cobalt and/or magnesium-doped nickel (IV) oxides.

TABLE 4

Discharge capacity retention for alkaline button cells with cathodes containing selected delithiated cobalt/magnesium/aluminum-doped nickel (IV) oxides

| Ex. No. | Nominal Compositions | Low-rate capacity 24 h @ 25° C. | Low-rate capacity 1 wk @ 25° C. | Capacity retention (%) | Low-rate capacity 1 wk @ 45° C. | Capacity retention (%) |
|---|---|---|---|---|---|---|
| 2b | $NiO_2$ | 334 | 317 | 95 | 278 | 83 |
| 4a | $Ni_{0.96}Co_{0.04}O_2$ | 364 | | | 321 | 88 |
| 4b | $Ni_{0.92}Co_{0.08}O_2$ | 358 | 333 | 93 | 314 | 88 |
| 4c | $Ni_{0.88}Co_{0.12}O_2$ | 337 | | | 302 | 90 |
| 4d-1 | $Ni_{0.98}Mg_{0.02}O_2$ | 359 | | | 322 | 90 |
| 4e-1 | $Ni_{0.96}Mg_{0.04}O_2$ | 365 | 347 | 95 | 308 | 84 |
| 4f-1 | $Ni_{0.92}Mg_{0.08}O_2$ | 190 | | | 228 | 120 |
| 4g-1 | $Ni_{0.96}Co_{0.02}Mg_{0.02}O_2$ | 322 | | | 287 | 89 |
| 4h-1 | $Ni_{0.92}Co_{0.06}Mg_{0.02}O_2$ | 368 | | | 318 | 86 |
| 4i-1 | $Ni_{0.92}Co_{0.04}Mg_{0.04}O_2$ | 373 | 362 | 97 | — | — |
| 4j-1 | $Ni_{0.92}Co_{0.02}Mg_{0.06}O_2$ | 369 | | | — | — |
| 4k-1 | $Ni_{0.88}Co_{0.10}Mg_{0.02}O_2$ | 303 | | | 265 | 87 |
| 4l-1 | $Ni_{0.88}Co_{0.08}Mg_{0.04}O_2$ | 316 | | | 283 | 90 |
| 4m-1 | $Ni_{0.88}Co_{0.06}Mg_{0.06}O_2$ | 347 | | | 318 | 92 |
| 4n-1 | $Ni_{0.88}Co_{0.04}Mg_{0.08}O_2$ | — | | | 293 | — |
| 4d-2 | $Ni_{0.98}Al_{0.02}O_2$ | 352 | | | 295 | 84 |
| 4e-2 | $Ni_{0.96}Al_{0.04}O_2$ | 363 | 236 | 65 | 324 | 89 |
| 4f-2 | $Ni_{0.92}Al_{0.08}O_2$ | 286 | | | 242 | 85 |
| 4g-2 | $Ni_{0.96}Co_{0.02}Al_{0.02}O_2$ | 359 | | | 302 | 84 |
| 4h-2 | $Ni_{0.92}Co_{0.06}Al_{0.02}O_2$ | 342 | | | 301 | 88 |
| 4i-2 | $Ni_{0.92}Co_{0.04}Al_{0.04}O_2$ | 340 | | | 294 | 86 |
| 4j-2 | $Ni_{0.92}Co_{0.02}Al_{0.06}O_2$ | 351 | | | 292 | 83 |
| 4k-2 | $Ni_{0.88}Co_{0.10}Al_{0.02}O_2$ | 338 | | | 302 | 89 |
| 4l-2 | $Ni_{0.88}Co_{0.08}Al_{0.04}O_2$ | 360 | | | 318 | 88 |
| 4m-2 | $Ni_{0.88}Co_{0.06}Al_{0.06}O_2$ | 340 | | | 266 | 78 |
| 4n-2 | $Ni_{0.88}Co_{0.04}Al_{0.08}O_2$ | 360 | | | 316 | 88 |
| C-2a | $Ni_{0.8}Co_{0.15}Al_{0.05}O_2$ | 325 | | | 230 | 70 |
| C-2b | $Ni_{0.791}Co_{0.149}Al_{0.049}B_{0.01}O_2$ | 335 | | | — | — |

Figure 9:
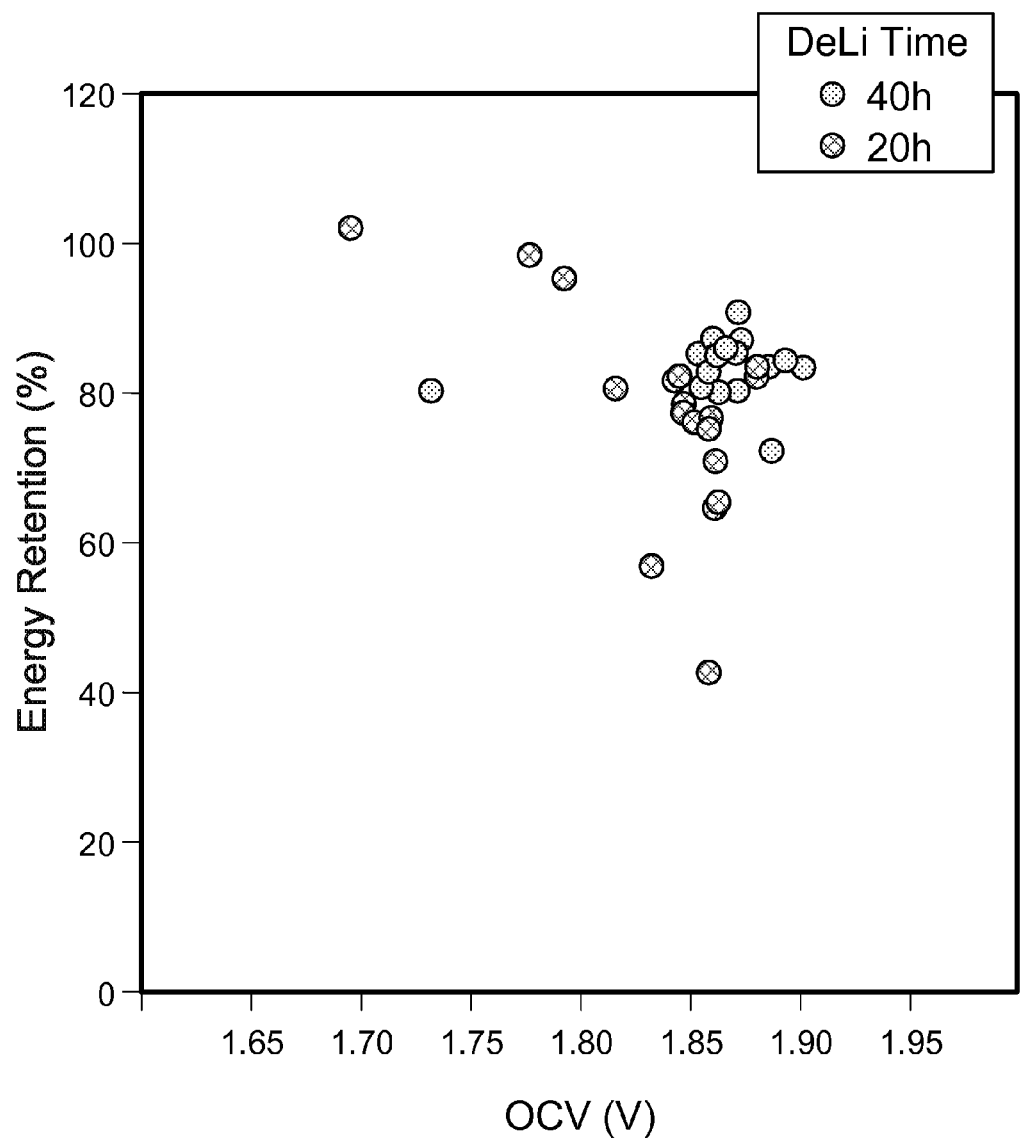
FIG. 9 is a plot depicting a comparison of capacity retention values for alkaline button cells containing delithiated metal-doped nickel (IV) oxides that were acid-treated for either 40 hours or 20 hours, and stored at 45° C. for 1 week before discharge, versus the corresponding initial OCV values.

Cells containing delithiated cobalt and/or aluminum-doped nickel (IV) oxide generally had lower capacity retention than cells containing cobalt- and/or magnesium-doped nickel (IV) oxide for similar total levels of substitution. No significant relationship between energy retention and OCV for cells held 24 hours at 45° C. was evident as shown in FIG. 9. Nearly all the cells containing delithiated metal-doped nickel(IV) oxides that had been acid-treated for at least 40 hours had a relatively narrow range of OCV values (e.g., 1.84-1.90 V) and had relatively high capacity retention values ranging from about 85 to 90%.

Partial substitution of other metal ions for nickel ions in delithiated lithium nickel oxides having the general formula $Li_xNi_{1-y-z}Co_yM^a_zO_2$, where $M^a$ is selected from cobalt, magnesium, aluminum, calcium, yttrium, manganese, and combinations of these, can produce a substantial decrease in the amount of oxygen evolved by the delithiated metal-doped nickel(IV) oxide compared to a delithiated undoped nickel (IV) oxide when immersed in alkaline electrolyte at 25° C. Button cells containing delithiated cobalt and magnesium-doped nickel(IV) oxides discharged fresh at low-rate can have specific capacities up to 112% of that for cells containing a delithiated undoped nickel(IV) oxide. Low levels of residual lithium in the delithiated metal-doped nickel(IV) oxides are desirable. Residual Li levels corresponding to x<0.1 in the general formula are preferred, while residual Li levels corresponding to x<0.08 are more preferred.

Partial substitution of nickel ions by other metal ions also markedly increased the post-storage capacity retention for cells containing the delithiated metal-doped nickel (IV) oxides relative to cells containing a delithiated undoped nickel(IV) oxide. Referring to Table 4, the improvement in post-storage capacity retention was more significant for cells stored for 1 week at 45° C. than at 25° C. A total metal substitution level corresponding to $0.01 \leq y+z \leq 0.15$, preferably $0.02 \leq y+z \leq 0.12$ in the general formula $Li_xNi_{1-y-z}Co_yM^a_zO_2$ is suitable, and a total metal substitution level corresponding to $0.04 \leq y+z \leq 0.10$ in the general formula $Li_xNi_{1-y-z}Co_yM^a_zO_2$ is preferred. Total metal substitution levels of y+z>0.15, preferably y+z>0.12 are undesirable because the decreased amount (i.e., <85%) of electrochemically active nickel (i.e., Ni(IV), Ni(III)) results in decreased total specific capacity. Substitution of nickel ions by magnesium ions is somewhat more effective than aluminum ions at decreasing amount of oxygen evolution while increasing the specific capacity and capacity retention, especially when present in combination with cobalt ions. However, substitution by cobalt only at relatively high levels, for example, y>0.1, can result in somewhat greater fresh capacity than delithiated undoped nickel (IV) oxide, but substantially lower capacity retention after storage at 45° C. Therefore, partial substitution (i.e., y≤0.1) of nickel by a combination of cobalt and another metal such as magnesium or aluminum is preferred in order to maximize fresh capacity, minimize oxygen evolution, and also maximize capacity retention for cells with cathodes including delithiated nickel (IV) oxides.

Example 5

Pre-Discharge of Button Cells Containing Delithiated Ni(IV) Oxide

Button cells with cathodes containing delithiated, metal-doped nickel(IV) oxides were assembled according to the method of Example 2. Within about 1 hour after closure, the cells were discharged until a portion of the capacity equal to 5 or 10% of the total estimated and/or theoretical specific capacity had been consumed. Some cells were discharged at a relatively low-rate (e.g., 7.5 mA/g, 10 mA/g). Other cells were pre-discharged at a relatively high-rate (e.g., 60 mA/g, 100 mA/g). Without wishing to be bound by theory, it is believed that higher rates can be advantageous because less capacity loss takes place during the time required to perform the pre-discharge. During pre-discharge, the cells were discharged at a constant drain rate, although in some cases, the cells were discharged intermittently (i.e., pulsed). Generally, pre-discharge was performed at ambient temperature. OCV was measured immediately before pre-discharge then again after a storage period (e.g., 24 hours, 1 week, or 2 weeks), i.e., immediately before discharge testing.

Figure 11:
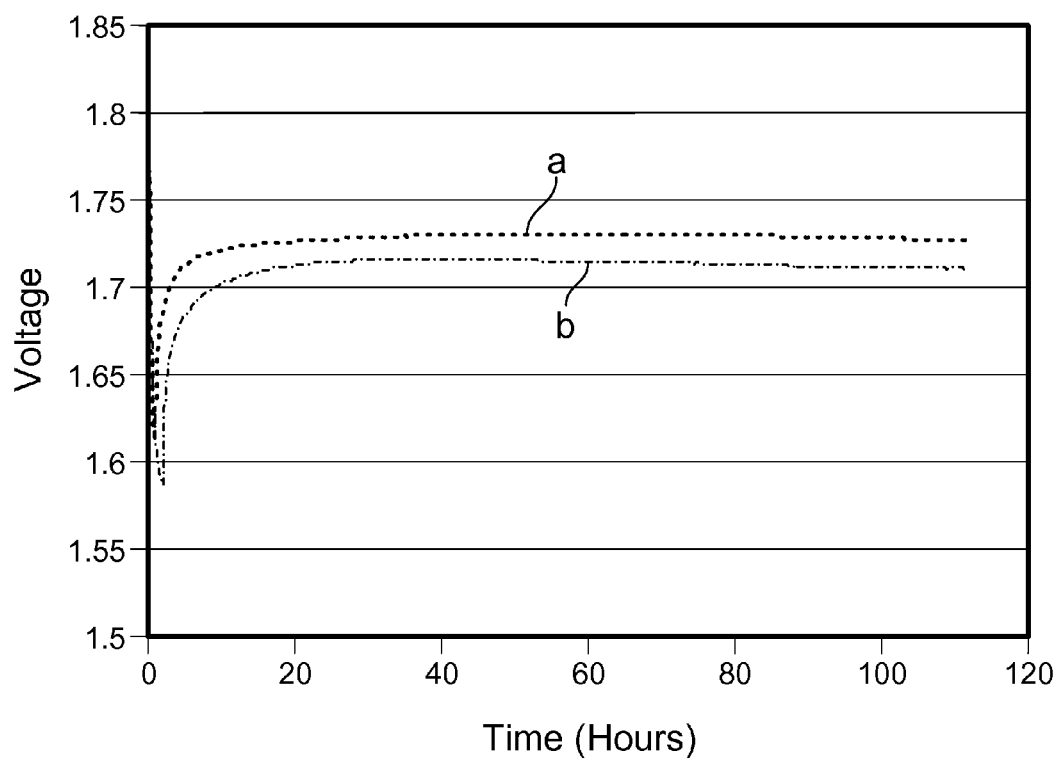
FIG. 11 is a plot depicting a comparison of OCV versus time for alkaline button cells with cathodes including delithiated, undoped nickel (IV) oxide that were pre-discharged at a continuous low-rate (i.e., 9.5 mA/g) by (a) 2.5% (upper curve) and (b) 5% (lower curve) of the total design capacity and held for at least 110 hours at 25° C.

To decrease the initial high rate of oxygen evolution immediately after cell assembly, and to decrease or suppress parasitic self-discharge processes that can occur during storage at ambient as well as elevated temperatures (e.g., 45° C., 60° C.), button cells with cathodes including delithiated metal-doped nickel(IV) oxides were assembled as described in Example 2 and pre-discharged within 1 hour after assembly, at either low (e.g., 7.5 mA/g, 10 mA/g) or high rates (e.g., 60 mA/g, 100 mA/g), until about 2.5%, 5%, or 10% of the total design capacity (e.g., about 7.5 mAh/g, 15 mAh/g, 30 mAh/g, respectively) had been consumed. For example, CCV values during pre-discharge for cells pre-discharged by 2.5% and 5% of their estimated design capacity (e.g., about 300 mAh/g) were about 1.62 and 1.58 V, respectively, compared to an initial OCV value before pre-discharge of about 1.86 V. After pre-discharge, OCV values of the cells recovered to 1.73 and 1.72 V, respectively, and were constant for >110 hours as shown in FIG. 11. Such an OCV value is comparable to that for NiOOH/Zn alkaline primary cells.

Button cells including cathodes containing selected compositions of delithiated, cobalt/magnesium/aluminum-doped nickel(IV) oxides were pre-discharged at a low rate (e.g., 7.5 mA/g) by an amount corresponding to 5% or 10% of their estimated total discharge capacity (i.e., about 300 mAh/g), immediately after cell assembly. The cells were then stored for one week at 25° C., 45° C. or 60° C. OCV was re-measured after storage immediately before low-rate discharge. The values are listed in Table 5 and can be compared to the corresponding initial OCV values measured prior to pre-discharge as well as the OCV values measured after pre-discharge and recovery (i.e., at least 1 hour).

for alkaline button cells with cathodes containing $Li_{0.07}Ni_{0.92}Co_{0.04}Mg_{0.04}O_2$ was lower than the initial OCV by up to 150 mV. After 1 week storage at 25° C., the OCV had risen by only about 30 mV. Further, after 1 week storage at either 45° C. or 60° C., the OCV was still nearly identical to that after pre-discharge (i.e., 1.72 V). In the case of a delithiated, undoped nickel (IV) oxide, the initial OCV decreased by nearly 140 mV after a 10% pre-discharge. The OCV value was maintained after storage for 2 weeks at 25° C. or 1 week at 60° C. However, a 5% pre-discharge was insufficient to decrease the OCV of most compositions to below about 1.80 V after pre-discharge. Further, cells pre-discharged by 5% had OCV values after 1 week storage at 60° C. nearly identical to those for cells pre-discharged by 10%. However, cells pre-discharged by 5% typically had higher OCV values than cells pre-discharged by 10% after 1 week storage at 25° C. or 45° C. Therefore, a pre-discharge of about 10% of the total estimated cell capacity can be applied in order to decrease the OCV of cells with a cathode including a nickel(IV)-containing oxide to a value comparable to that of NiOOH/Zn cells.

Example 6

Pre-Discharge of Button Cells Containing Delithiated Nickel(IV) Oxide

Figure 12:
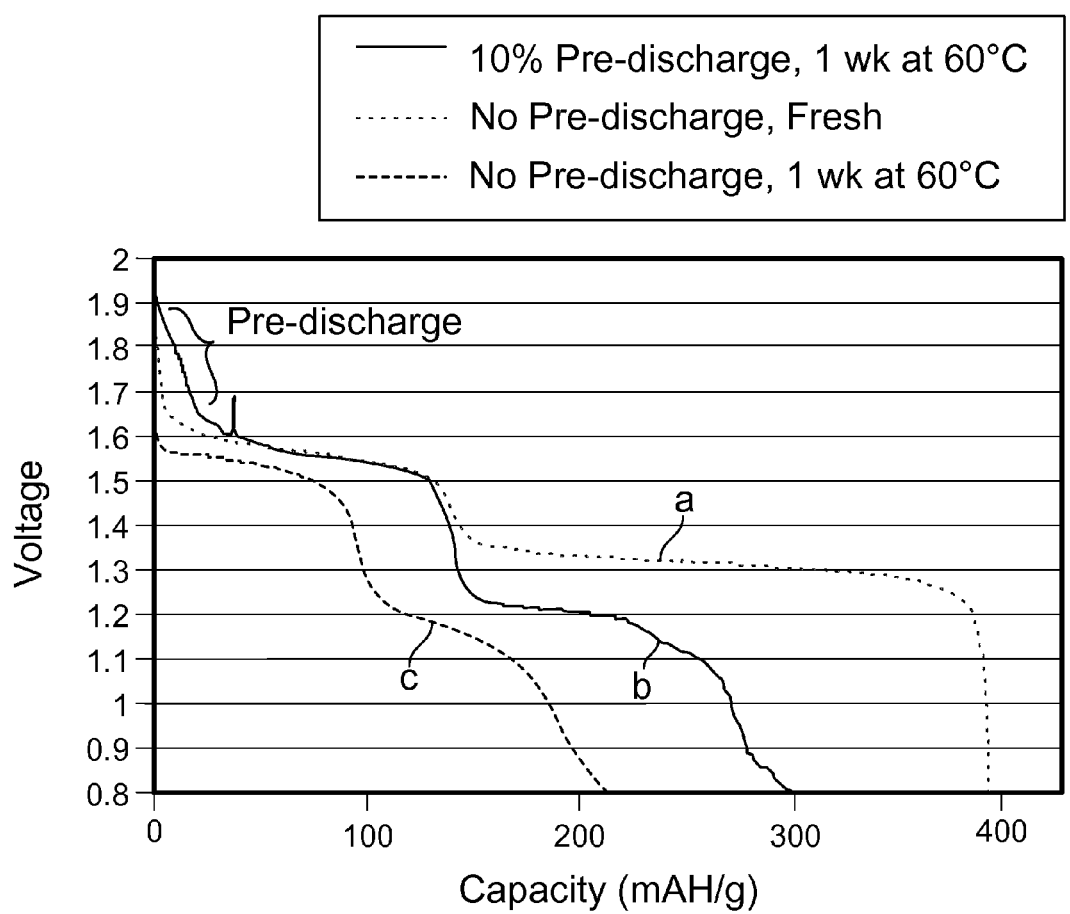
FIG. 12 is a plot depicting a an overlay of the discharge voltage profile curves for alkaline button cells with cathodes including a delithiated undoped nickel (IV) oxide: (a) stored 24 hours at 25° C.; (b) pre-discharged by 10% of the total design capacity and stored one week at 60° C.; (c) stored 1 week at 60° C. and discharged at a nominal low rate (i.e., 9.5 mA/g) to a 0.8 V cutoff voltage.

Button cells with cathodes containing delithiated, undoped nickel(IV) oxide were pre-discharged by 10% of their design capacity as in Example 5, stored for one to two weeks at 25° C. or one week at 45° C. or 60° C., and discharged at a relative low rate (e.g., 7.5 mA/g) to a 0.8 V cutoff voltage. As shown in FIG. 12, pre-discharged cells containing delithiated undoped nickel(IV) oxide stored 1 week at 60° C. retained up to about 80% of the capacity for cells discharged 24 hours after closure. In contrast, cells that had not been pre-discharged retained only about 50% of their capacity after 1 week storage at 60° C. To evaluate the effect of depth of pre-discharge on capacity retention after storage, button cells with cathodes containing delithiated undoped nickel(IV) oxide and selected compositions of delithiated metal-doped nickel(IV) oxides were pre-discharged by either 5% or 10% of their design capacity, stored for 1 or 2 weeks at 25° C. or 1 week at 45° C. or 60° C., and then discharged at low-rate (e.g., 7.5 mA/g) to a 0.8 V cutoff voltage. Capacity retention was calculated as the percentage ratio of the low-rate capacity of a cell discharged after storage for 24 hours at 25° C. compared to that for a comparable cell discharged after storage for 1 or 2 weeks at 25°. Capacity retention values were determined for non-pre-discharged and pre-discharged cells containing delithiated undoped nickel(IV) oxide and selected delithiated

TABLE 5

OCV values after 1 week storage at 25° C., 45° C. and 60° C. for alkaline button cells with cathodes including selected delithiated cobalt/magnesium/aluminum-doped nickel (IV) oxides and pre-discharged by 5% or 10% of their capacity.

| | | OCV after Storage (V) | | | | | | | | |
|---|---|---|---|---|---|---|---|---|---|---|
| | | Pre-discharge | | | 5% Pre-discharge | | | 10% Pre-discharge | | |
| Ex. No. | Nominal Compositions | 0% 1 hr | 5% 1 hr | 10% 1 hr | 1 wk 25° C. | 1 wk 45° C. | 1 wk 60° C. | 1 wk 25° C. | 1 wk 45° C. | 1 wk 60° C. |
| 2b | $Li_{0.06}NiO_2$ | 1.86 | 1.78 | 1.72 | 1.77 | 1.91 | 1.70 | 1.73 | 1.89 | 1.70 |
| 4e-1 | $Li_{0.06}Ni_{0.96}Mg_{0.04}O_2$ | 1.84 | 1.78 | 1.72 | 1.77 | 1.90 | 1.70 | 1.73 | 1.88 | 1.71 |
| 4e-2 | $Li_{0.07}Ni_{0.96}Al_{0.04}O_2$ | 1.88 | 1.84 | 1.75 | 1.80 | 1.76 | 1.72 | 1.76 | 1.75 | 1.72 |
| 4i-1 | $Li_{0.07}Ni_{0.92}Co_{0.04}Mg_{0.04}O_2$ | 1.87 | 1.82 | 1.72 | 1.79 | 1.74 | 1.71 | 1.75 | 1.73 | 1.71 |
| C-2a | $Li_xNi_{0.8}Co_{0.15}Al_{0.05}O_2$ | 1.85 | --- | --- | --- | --- | --- | tbd | tbd | --- |

Prior to pre-discharge, the initial OCV values ranged from about 1.84 to 1.88 V or higher, which is above the potential needed to breakdown water and evolve oxygen. After pre-discharge by about 10% of the total estimated capacity, OCV metal-doped nickel(IV) oxides that had been stored at 25° C. for 1 or 2 weeks and are compared in Table 6.

TABLE 6

Capacity retention for alkaline button cells with cathodes including selected delithiated cobalt/magnesium/aluminum-doped nickel (IV) oxides after storage for 1 to 2 weeks at 25° C. with or without 5% or 10% pre-discharge

| | | Capacity Retention at 25° C. (%) | | | | | |
|---|---|---|---|---|---|---|---|
| | | 0% Pre-discharge | | 5% Pre-discharge | | 10% Pre-discharge | |
| Ex. No. | Nominal Compositions | 1 wk | 2 wks | 1 wk | 2 wks | 1 wk | 2 wks |
| 2b | $Li_{0.06}NiO_2$ | 90 | — | 94 | 91 | 97 | 96 |
| 4e-1 | $Li_{0.06}Ni_{0.96}Mg_{0.04}O_2$ | 95 | — | 95 | 93 | 95 | 93 |
| 4e-2 | $Li_{0.07}Ni_{0.96}Al_{0.04}O_2$ | 95 | — | 97 | 91 | — | — |
| 4i-1 | $Li_{0.07}Ni_{0.92}Co_{0.04}Mg_{0.04}O_2$ | 97 | — | 98 | 91 | 100 | 100 |
| 4b | $Li_{0.12}Ni_{0.92}Co_{0.08}O_2$ | 93 | — | — | — | — | — |

Referring to Table 7, capacity retention values for cells containing delithiated metal-doped nickel(IV) oxides having the same nominal compositions as those listed in Table 6 that had been pre-discharged by either 5 or 10% of their design capacity before storage for 1 week at 45 or 60° C. were compared to those for corresponding cells containing delithiated metal-doped nickel(IV) oxides having the same compositions that had not been pre-discharged before storage.

Figure 13:
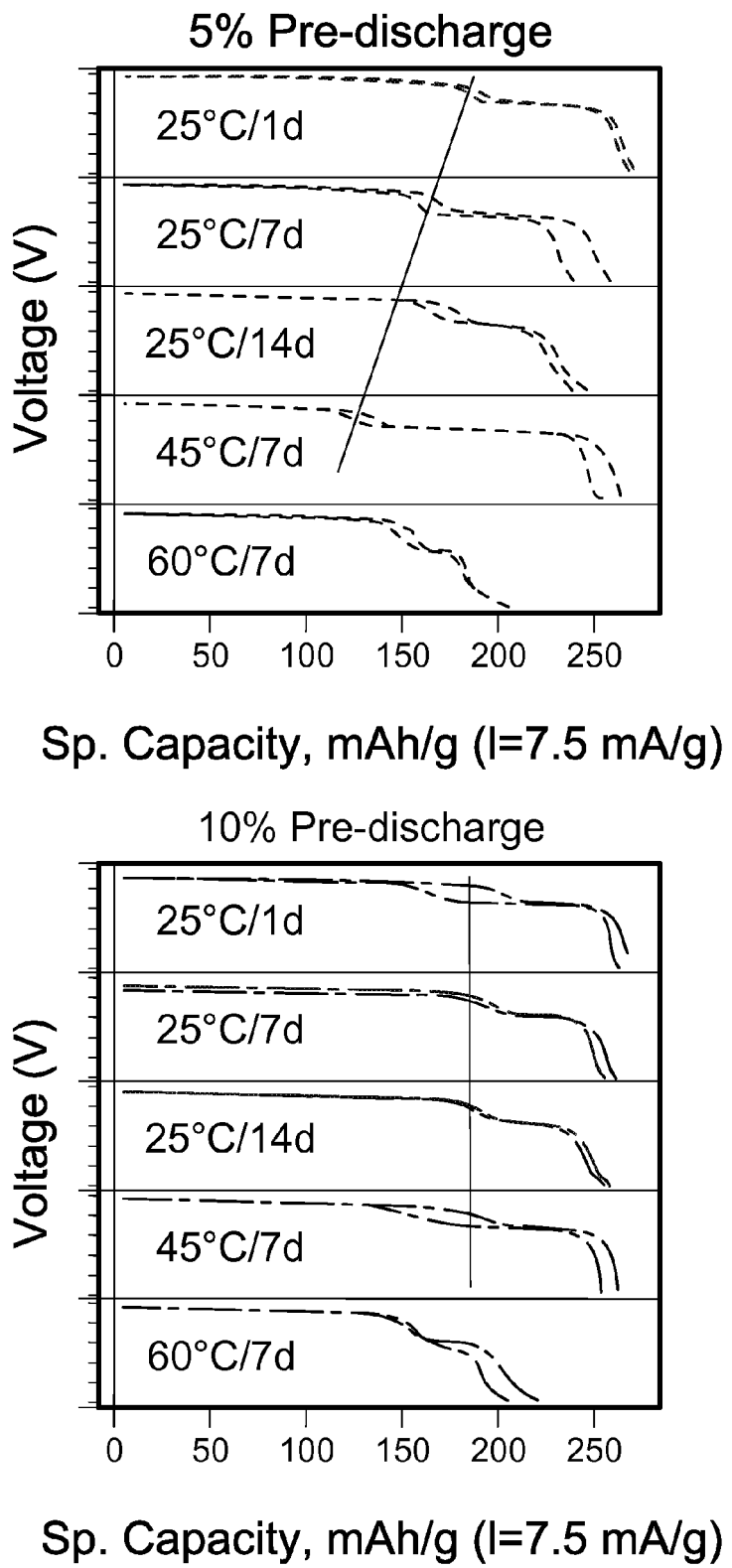
FIG. 13 includes an overlay of plots depicting a comparison of discharge curves for alkaline button cells with cathodes including a delithiated, undoped nickel (IV) oxide that were pre-discharged by either (a) 5% or (b) 10% of the total design capacity and discharged at a nominal low rate (i.e., 7.5 mA/g) to a 0.8 V cutoff voltage after storage for 1, 7, and 14 days at 25° C.; 7 days at 45° C.; and 7 days at 60° C.

13. For cells stored 1 week at 45° C. and 60° C., capacity retention was nominally the same (i.e., 96% and 76%, respectively) for cells pre-discharged by either 5% or 10% of their design capacity. In comparison, lower capacity retention values of 83% and 54% were obtained for cells that were not pre-discharged prior to storage at 45° C. and 60° C., respectively. In addition, as shown in FIG. 13, the shape of the discharge curves for the cells stored at 45° C. differed significantly from those for cells stored at 60° C. This difference supports the possibility that different parasitic self-discharge

TABLE 7

Capacity retention for alkaline button cells with cathodes including selected delithiated cobalt/magnesium/aluminum-doped nickel (IV) oxides after storage for 1 week at 25, 45, and 60° C. with or without 5% or 10% pre-discharge.

| | | Capacity Retention (%) | | | | | | | | |
|---|---|---|---|---|---|---|---|---|---|---|
| | | 0% Pre-discharge | | | 5% Pre-discharge | | | 10% Pre-discharge | | |
| Ex. No. | Nominal Compositions | 1 wk 25° C. | 1 wk 45° C. | 1 wk 60° C. | 1 wk 25° C. | 1 wk 45° C. | 1 wk 60° C. | 1 wk 25° C. | 1 wk 45° C. | 1 wk 60° C. |
| 2b | $Li_{0.06}NiO_2$ | 90 | 83 | 54 | 94 | 96 | 77 | 97 | 96 | 76 |
| 4e-1 | $Li_{0.06}Ni_{0.96}Mg_{0.04}O_2$ | 95 | 84 | — | 95 | 98 | 84 | 95 | 100 | 88 |
| 4e-2 | $Li_{0.07}Ni_{0.96}Al_{0.04}O_2$ | 95 | 89 | — | 96 | 86 | 77 | — | — | — |
| 4i-1 | $Li_{0.07}Ni_{0.92}Co_{0.04}Mg_{0.04}O_2$ | 97 | 86 | — | 98 | 91 | 75 | 100 | 92 | 87 |
| 4b | $Li_{0.12}Ni_{0.92}Co_{0.08}O_2$ | 93 | 88 | — | — | — | — | — | — | — |
| C-2a | $Li_xNi_{0.8}Co_{0.15}Al_{0.05}O_2$ | — | 75 | 73 | — | — | — | — | — | — |

The use of pre-discharge as a conditioning method to increase capacity retention of alkaline cells with cathodes including delithiated cobalt/magnesium/aluminum-doped nickel (IV) oxides was less effective for cells stored at 25° C. (i.e., ambient temperature) than for cells stored at higher temperatures (e.g., 45° C., 60° C.). For example, cells with cathodes including active materials having the compositions listed in Table 6 had comparable capacity retention after 1 week storage at 25° C. regardless of whether they were pre-discharged at 0%, 5% or 10% of their total estimated capacity. Further, the effect of pre-discharge was relatively small for cells stored for up to 2 weeks at 25° C.

In the case of cells stored for 1 week at 45° C. or 60° C., the cells that had been pre-discharged by 10% generally had better capacity retention than those not pre-discharged or pre-discharged by only 5% as shown in Table 7. Further, in the case of cells with cathodes containing delithiated, undoped nickel(IV) oxide, capacity retention values for cells that had been pre-discharged by 0%, 5%, and 10% and then stored 1 week at 25° C. were 90%, 94%, and 97%, respectively. The corresponding voltage profile curves for cells discharged at low-rate after 5% and 10% pre-discharge are depicted in FIG.

processes could be taking place at the two temperatures. Further, all button cells with cathodes containing a delithiated, magnesium-doped nickel (IV) oxide with the nominal composition $Li_{0.06}Ni_{0.96}Mg_{0.04}O_2$ had the same capacity retention (95%) after 1 week storage at 25° C. independent of the amount of pre-discharge. However, the beneficial effect of the pre-discharge process was most evident for cells stored 1 week at either 45° C. or 60° C. Specifically, the pre-discharged cells had 98-100% capacity retention after storage for 1 week at 45° C. and 84-88% after 1 week at 60° C. The corresponding value for cells not pre-discharged and stored at 45° C. was only 84%.

Figure 14:
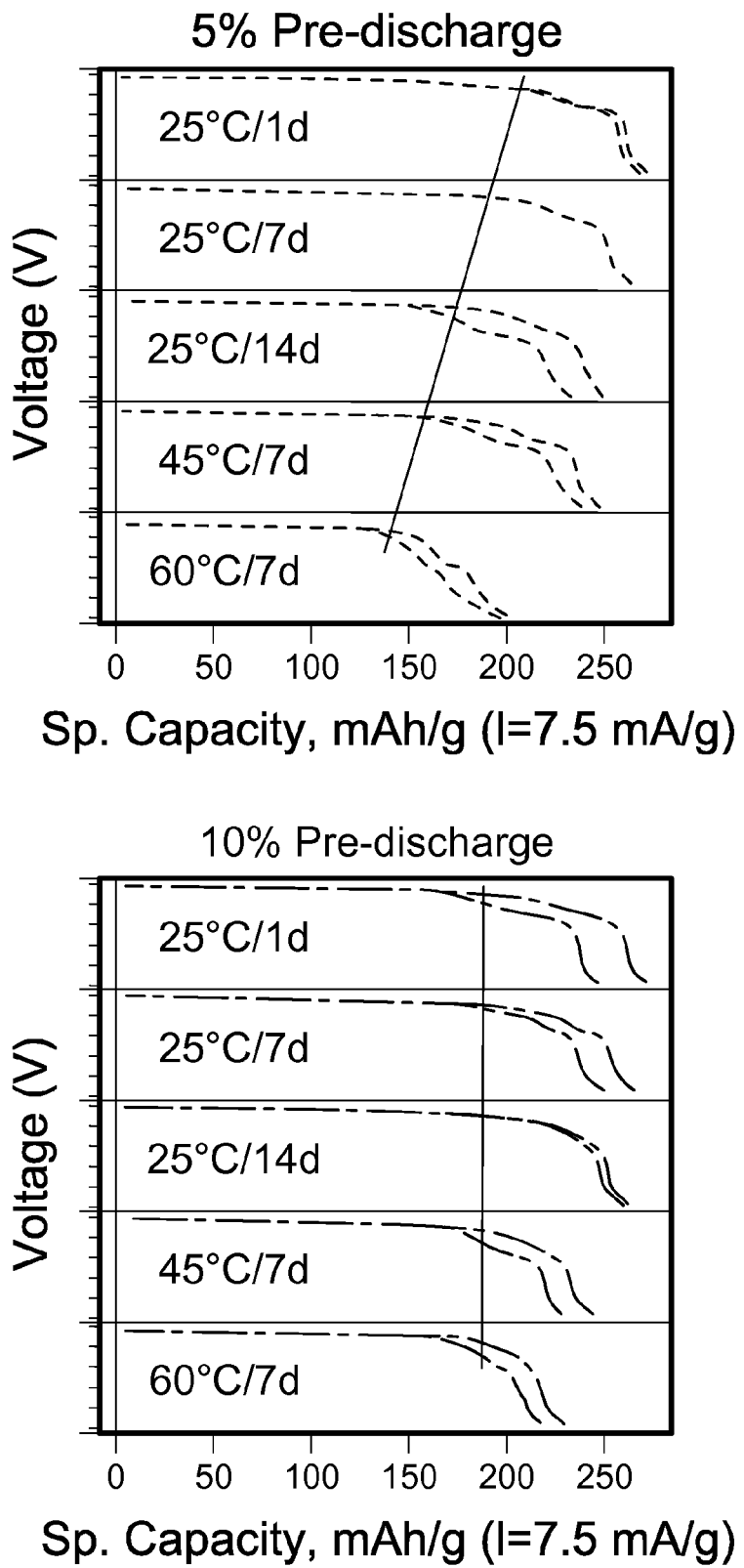
FIG. 14 includes overlays of plots depicting a comparison of discharge curves for alkaline button cells with cathodes including a delithiated, cobalt and magnesium-doped nickel (IV) oxide, $Li_{0.07}Ni_{0.92}Co_{0.04}Mg_{0.04}O_2$, that were pre-discharged by either (a) 5% or (b) 10% of the total design capacity and discharged at a nominal low rate (i.e., 7.5 mA/g) to a 0.8 V cutoff voltage after storage for 1, 7, and 14 days at 25° C.; 7 days at 45° C.; and 7 days at 60° C.

Yet another example is provided by button cells with cathodes containing a delithiated cobalt and magnesium-doped nickel (IV) oxide with the nominal composition $Li_{0.07}Ni_{0.92}Co_{0.04}Mg_{0.04}O_2$ stored 1 week at 25° C. Capacity retention values of 97, 98, and 100% were obtained for cells pre-discharged by 0, 5, and 10%, respectively. The corresponding discharge curves are depicted in FIG. 14. Capacity retention values for cells pre-discharged by 5% and 10% and stored 1 week at 45° C. were 91 and 92%, respectively, and for cells pre-discharged by 5% and 10% and stored 1 week at 60°

C., 75 and 87%, respectively. The corresponding value for cells not pre-discharged and stored at 45° C. was 86%. Thus, the combination of metal-substitution for nickel in delithiated Ni(IV)-containing complex oxides and pre-discharge of cells by 5 to 10% of their total design capacity shortly after assembly has been demonstrated to be particularly effective at decreasing the initial OCV as well as improving capacity retention after storage at elevated temperatures.

Comparative Example 1

Synthesis of β-Nickel Oxyhydroxide

A sample of spherical cobalt oxyhydroxide-coated β-nickel oxyhydroxide powder was prepared from a commercial spherical β-nickel hydroxide (e.g., Kansai Catalyst Co., Ltd., Osaka, Japan) as disclosed by the general method disclosed, for example, in U.S. Pat. No. 8,043,748.

A cathode mix was prepared by blending an oxidation-resistant graphite and an electrolyte solution containing 35.3 wt % KOH and 2 wt % zinc oxide with spherical β-nickel oxyhydroxide powder in a weight ratio of nickel oxyhydroxide:graphite:electrolyte of 75:20:5. Button cells were fabricated by the general method described in Example 2. The cells of Comparative Example 1 were tested within 24 hours after fabrication. OCV measured immediately before discharge was 1.72 V. Cells were discharged at about 10 mA/g constant current corresponding to a nominal C/30 rate to a 0.8 V cutoff voltage. Average discharge capacity for the cells of Comparative Example 1 was about 200 mAh/g.

Comparative Example 2

Synthesis of Delithiated $Li_x(Ni_{0.8}Co_{0.15}Al_{0.05})O_2$ and $Li_x(Ni_{0.8}Co_{0.15}Al_{0.05})_{0.99}B_{0.01}O_2$ Samples of commercial lithium nickel cobalt aluminum oxide powders (Toda America Inc., Battle Creek, Mich.) having the nominal compositions $LiNi_{0.8}Co_{0.15}Al_{0.05}O_2$ and $Li(Ni_{0.8}Co_{0.15}Al_{0.05})_{0.99}B_{0.01}O_2$ (i.e., $LiNi_{0.792}Co_{0.149}Al_{0.049}B_{0.01}O_2$) were delithiated by the acid treatment process of Example 2 above to form the delithiated metal-substituted Ni(IV) oxides of Comparative Examples 2a and 2b, respectively. Button cells were fabricated by the general method of Example 2. The cells of Comparative Example 2 were tested within 24 hours after fabrication. OCV values ranged from about 1.83 to 1.85 V. Cells were discharged at a low rate of about 10 mA/g constant current corresponding to a nominal C/30 rate to a 0.8 V cutoff voltage. Discharge curves for cells containing the delithiated cobalt and aluminum-doped nickel oxide of Comparative Example 2a and the cobalt, aluminum, and boron-doped nickel oxide of Comparative Example 2b are compared to those for cells containing the delithiated $Li_xNiO_2$ of Example 2b and a commercial battery-grade EMD in FIG. 10. Average discharge capacities for cells containing the delithiated cobalt/aluminum/boron-doped nickel oxides of Comparative Examples 2a and 2b were 325 mAh/g and 335 mAh/g, respectively.

Comparative Example 3

Synthesis of delithiated $Li_xNi_{1-y}Co_yO_2$ (y=0.1, 0.2)

Samples of commercial lithium nickel cobalt oxide powders (e.g., NEI Corp., Somerset, N.J.) having the nominal chemical compositions $LiNi_{0.9}Co_{0.2}O_2$ and $LiNi_{0.8}Co_{0.1}O_2$ were delithiated by the acid treatment process of Example 2 above to form the delithiated metal-doped nickel(IV) oxides of Comparative Examples 3a and 3b, respectively.

A number of embodiments of the invention have been described. Nevertheless, it will be understood that various modifications may be made without departing from the spirit and scope of the invention. For example, a delithiated metal-doped nickel(IV)-containing complex oxide can be used as the active material in the positive electrode of an electrochemical capacitor (i.e., super-capacitor, ultra-capacitor, pseudo-capacitor). In some embodiments, a delithiated or a partially delithiated nickel(IV)-containing complex oxide can function as an oxidation catalyst. For example, the complex oxide can be included in the cathode of a metal-air battery, for example, a zinc-air cell. In some embodiments, a delithiated nickel(IV)-containing oxide can function as an efficient catalyst for breakdown of water to generate molecular oxygen.

In some embodiments, a delithiated metal-doped nickel (IV) oxide can function as the cathode active material in a rechargeable alkali metal-ion battery, a rechargeable alkaline earth metal-ion battery, a primary alkali metal battery or a primary alkaline earth metal battery including an aqueous, non-aqueous, polymeric or solid electrolyte. The alkali metal can be selected from Li, Na, K, or a combination thereof. The alkaline earth metal can be selected from Mg, Ca, or a combination thereof.

Other embodiments are within the scope of the following claims.

What is claimed is:

1. A method of making a pre-discharged primary alkaline battery, comprising:
   (a) partially discharging an assembled primary alkaline battery at a constant current discharge rate from 5 mA/g to 100 mA/g of active material,
   the partially discharging of the assembled primary alkaline battery being completed within about one hour after assembly of the primary alkaline battery is completed to result in a partially discharged primary alkaline battery;
   (b) maintaining the partially discharged primary alkaline battery for a period of time ranging from 1 to 24 hours at a temperature in the range of 25 to 70° C. to result in a pre-discharged primary alkaline battery;
   wherein the pre-discharged primary alkaline battery has an open circuit voltage value of less than or equal to 1.75 V at 25° C. and
   said pre-discharged primary alkaline battery comprises:
   a cathode comprising an oxide having a formula $A_xNi_{1-y-z-x}Co_yM^a_zM^b_wO_2$;
   an anode;
   a separator between the cathode and the anode; and
   an alkaline electrolyte,
   wherein
   A is an alkali metal;
   $M^a$ is a metal dopant, the metal dopant comprising Co, Mg, Al, Co, Mn, or Y;
   $M^b$ is a non-metal dopant, the non-metal dopant comprising B, Si, or Ge;
   $0 \leq x \leq 0.2$.
   w is 0, or $0 \leq w \leq 0.02$; and
   $0.02 \leq y+z \leq 0.25$.

2. The method of claim 1, wherein the pre-discharged primary alkaline battery has a capacity retention of at least 95 percent of the capacity of a battery discharged within 24 hours after manufacture, after storage for at least one week at 25° C.

3. The method of claim 1, wherein the pre-discharged primary alkaline battery has a decrease in oxygen evolution of at least 50% compared to a freshly assembled battery.

4. The method of claim 1, wherein the pre-discharged primary alkaline battery has an open circuit voltage value of from 1.65 to 1.75 V at 25° C.

5. The method of claim 1, wherein the assembled primary alkaline battery is partially discharged by 15 percent or less of a total battery design capacity.

6. The method of claim 1, wherein the assembled primary alkaline battery is partially discharged by 10 percent or less of a total battery design capacity.

7. The method of claim 1, wherein the assembled primary alkaline battery is partially discharged by 7.5 percent or less of a total battery design capacity.

8. The method of claim 1, wherein the assembled primary alkaline battery is partially discharged by five percent or less of a total battery design capacity.

9. The method of claim 1, wherein partially discharging the assembled primary alkaline battery is performed in discrete steps.

10. The method of claim 1, wherein partially discharging the assembled primary alkaline battery is performed at 25° C.

11. The method of claim 1, wherein partially discharging the assembled primary alkaline battery is performed at a temperature of from 20 to 30° C.

\* \* \* \* \*